United States Patent
Nakazawa et al.

(10) Patent No.: US 11,343,798 B2
(45) Date of Patent: May 24, 2022

(54) COMMUNICATION SYSTEM

(71) Applicant: Mitsubishi Electric Corporation, Tokyo (JP)

(72) Inventors: Masayuki Nakazawa, Tokyo (JP); Mitsuru Mochizuki, Tokyo (JP); Hideo Umehara, Tokyo (JP); Kuniyuki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/030,045

(22) Filed: Sep. 23, 2020

(65) Prior Publication Data

US 2021/0007077 A1   Jan. 7, 2021

Related U.S. Application Data

(63) Continuation of application No. 16/320,119, filed as application No. PCT/JP2017/027597 on Jul. 31, 2017, now Pat. No. 10,827,462.

(30) Foreign Application Priority Data

Aug. 5, 2016  (JP) .................................. 2016154272

(51) Int. Cl.
*H04W 68/10*   (2009.01)
*H04W 76/15*   (2018.01)
(Continued)

(52) U.S. Cl.
CPC ............ *H04W 68/10* (2013.01); *H04B 7/024* (2013.01); *H04W 16/32* (2013.01);
(Continued)

(58) Field of Classification Search
None
See application file for complete search history.

(56) References Cited

U.S. PATENT DOCUMENTS 3,663,762 A * 5/1972 Joel, Jr. ................. H04W 36/08
455/440
5,862,142 A * 1/1999 Takiyasu ............... H04B 1/7156
370/480
(Continued)

FOREIGN PATENT DOCUMENTS

EP   2180744 A1 *  4/2010  ............ H04W 12/08
JP   4810313 B2 * 11/2011
(Continued)

OTHER PUBLICATIONS

Decision of Refusal dated Sep. 7, 2021 in Japanese Patent Application No. 2018-531874 (with English machine translation), 7 pages.

(Continued)

*Primary Examiner* — Jamaal Henson
(74) *Attorney, Agent, or Firm* — Oblon, McClelland, Maier & Neustadt, L.L.P.

(57) ABSTRACT

In a communication system, a plurality of base stations includes an MeNB being a first base station, and a plurality of SeNBs to be connected to the MeNB. At least one of control plane data about control of communication and user plane data about a user is transmitted to and received from a user equipment (UE) via the first base station being the MeNB. The control plane data and the user plane data are contained in information provided by a core network about communication with the UE. The communication system can simplify processing of at least one of control plane data and user plane data when a communication terminal device communicates with a plurality of base station devices.

3 Claims, 26 Drawing Sheets

(51) Int. Cl.
  *H04B 7/024* (2017.01)
  *H04W 72/00* (2009.01)
  *H04W 72/04* (2009.01)
  *H04W 16/32* (2009.01)
(52) U.S. Cl.
  CPC ......... *H04W 72/005* (2013.01); *H04W 72/04* (2013.01); *H04W 76/15* (2018.02)

(56) References Cited

U.S. PATENT DOCUMENTS

| | | | | |
|---|---|---|---|---|
| 10,542,473 | B2* | 1/2020 | Fan | H04W 36/08 |
| 10,791,481 | B2* | 9/2020 | Nguyen | H04W 72/1273 |
| 2009/0109933 | A1* | 4/2009 | Murasawa | H04L 63/029 |
| | | | | 370/335 |
| 2011/0261743 | A1* | 10/2011 | Futaki | H04W 72/0453 |
| | | | | 370/312 |
| 2012/0244864 | A1* | 9/2012 | Fujii | H04W 36/0066 |
| | | | | 455/436 |
| 2013/0136029 | A1* | 5/2013 | Matsuo | H04W 72/042 |
| | | | | 370/252 |
| 2013/0157660 | A1* | 6/2013 | Awad | H04W 72/046 |
| | | | | 455/435.1 |
| 2013/0225192 | A1* | 8/2013 | Yamamoto | H04W 56/001 |
| | | | | 455/452.1 |
| 2014/0080488 | A1* | 3/2014 | Michel | H04W 36/04 |
| | | | | 455/436 |
| 2014/0192740 | A1* | 7/2014 | Ekpenyong | H04L 5/0035 |
| | | | | 370/329 |
| 2015/0092942 | A1* | 4/2015 | Wager | H04W 12/0433 |
| | | | | 380/270 |
| 2015/0201383 | A1* | 7/2015 | Papasakellariou | H04W 52/146 |
| | | | | 370/278 |
| 2015/0229413 | A1* | 8/2015 | Takeda | H04L 5/0053 |
| | | | | 370/329 |
| 2016/0212682 | A1* | 7/2016 | Chung | H04W 12/06 |
| 2016/0255583 | A1* | 9/2016 | Takeda | H04W 52/0206 |
| | | | | 370/311 |
| 2016/0380779 | A1* | 12/2016 | Sharma | H04L 12/189 |
| | | | | 370/312 |
| 2017/0048151 | A1* | 2/2017 | Jung | H04W 36/0044 |
| 2017/0374672 | A1* | 12/2017 | Selvaganapathy | H04W 76/34 |
| 2020/0028745 | A1* | 1/2020 | Parkvall | H04W 52/0245 |

FOREIGN PATENT DOCUMENTS

| | | | | |
|---|---|---|---|---|
| JP | 5282491 | B2 * | 9/2013 | H04W 64/00 |
| JP | 2015-177424 | A | 10/2015 | |
| JP | 2015-185891 | A | 10/2015 | |
| WO | WO-2010125853 | A1 * | 11/2010 | H04W 72/005 |
| WO | WO 2015/115458 | A1 | 8/2015 | |
| WO | WO 2016/113083 | A1 | 7/2016 | |

OTHER PUBLICATIONS

Notice of Reasons for Refusal dated May 25, 2021 in Japanese Patent Application No. 2018-531874 (with English machine translation), 8 pages.
International Search Report dated Sep. 19, 2017 in PCT/JP2017/027597 filed on Jul. 31, 2017.
ZTE, "Discussion on control plane for the DC based LTE/NR tight interworking," 3GPP TSG RAN WG2 Meeting #94, Nanjing, China, May 23-27, 2016, R2-163741 (Total 4 pages).
ZTE, "Interworking Scenarios Between NextGen NW and LTE," 3GPP TSG RAN WG Meeting #91 bis, Bangalore, India, Apr. 11-15, 2016, R3-160791 (Total 4 pages).
Huawei, HiSilicon, "LTE-NR tight interworking control plane," 3GPP TSG-RAN WG2 Meeting #94, Nanjing, China, May 23-27, 2016, R2-164268 (Total 4 pages).
3GPP TS 36.300, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Release 13, Jun. 2015 (Total 254 pages).
3GPP SA WG1, "LS on HNB/HeNB Open Access Mode," 3GPP TSG-SA1 #42, Seoul, South Korea, Oct. 13-17, 2008, S1-083461 (Total 2 pages).
3GPP TR 36.814, 3rd Generation Partnership Project; Technical Specification Group Radio Access Network; Evolved Universal Terrestrial Radio Access (E-UTRA); Further advancements for E-UTRA physical layer aspects, Release 9, Mar. 2010 (Total 144 pages).
3GPP TR 36.912, 3rd Generation Partnership Project; Technical Specification Group Radio Access Network; Feasibility study for Further Advancements for E-UTRA (LTE-Advanced), Release 10, Mar. 2011 (Total 212 pages).
Metis, Seventh Framework Programme, "Scenarios, requirements and KPIs for 5G mobile and wireless system," Deliverable D1.1, Document No. ICT-317669-METIS/D1.1, Apr. 29, 2013 (Total 83 pages).
3GPP TS 36.211, 3rd Generation Partnership Project; Technical Specification Group Radio Access Network; Evolved Universal Terrestrial Radio Access (E-UTRA); Physical channels and modulation, Release 13, Dec. 2015 (Total 142 pages).
3GPP TR 36.897, 3rd Generation Partnership Project; Technical Specification Group Radio Access Network; Study on elevation beamforming / Full-Dimension (FD) Multiple Input Multiple Output (MIMO) for LTE, Release 13, Jun. 2015 (Total 58 pages).
NTT Docomo, Inc., "Discussion on LTE-NR aggregation," 3GPP TSG-RAN WG2 Meeting #94, Nanjing, China, May 23-27, 2016, R2-163702 (Total 3 pages).
3GPP TS 36.300, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Release 11, Sep. 2013 (Total 209 pages).
RAN2, "LS on CSG cell identification," 3GPP TSG-RAN WG 2 meeting #62, Kansas City, Missouri, United States, May 5-9, 2008, R2-082899 (Total 2 pages).
Extended European Search Report dated Feb. 24, 2020 in corresponding European Patent Application No. 17836894.0, 8 pages.
ZTE, "Discussion on Control Plane for the DC based LTE/NR Tight Interworking", May 2016, submitted in the IDS by the application (Year: 2016).
Indian Office Action dated Sep. 23, 2021 in Indian Patent Application No. 2019470023071 (with English translation), 7 pages.
European Office Action dated Oct. 8, 2021 in European Patent Application No. 17 836 894.0, 6 pages.

\* cited by examiner

F I G . 1
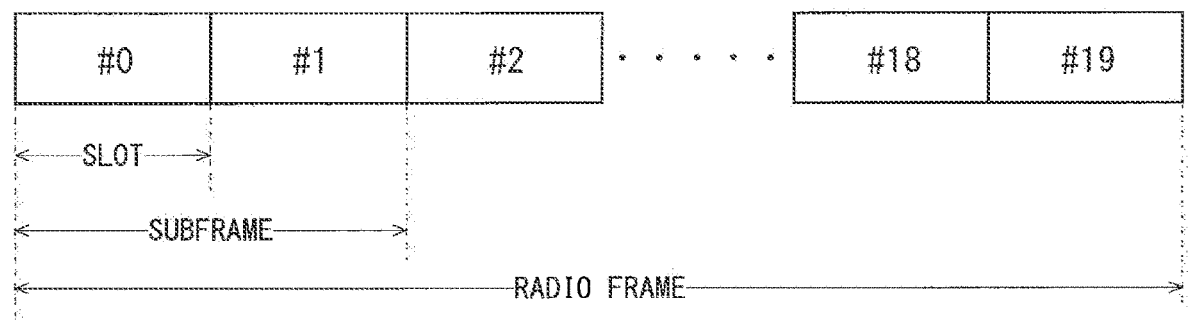

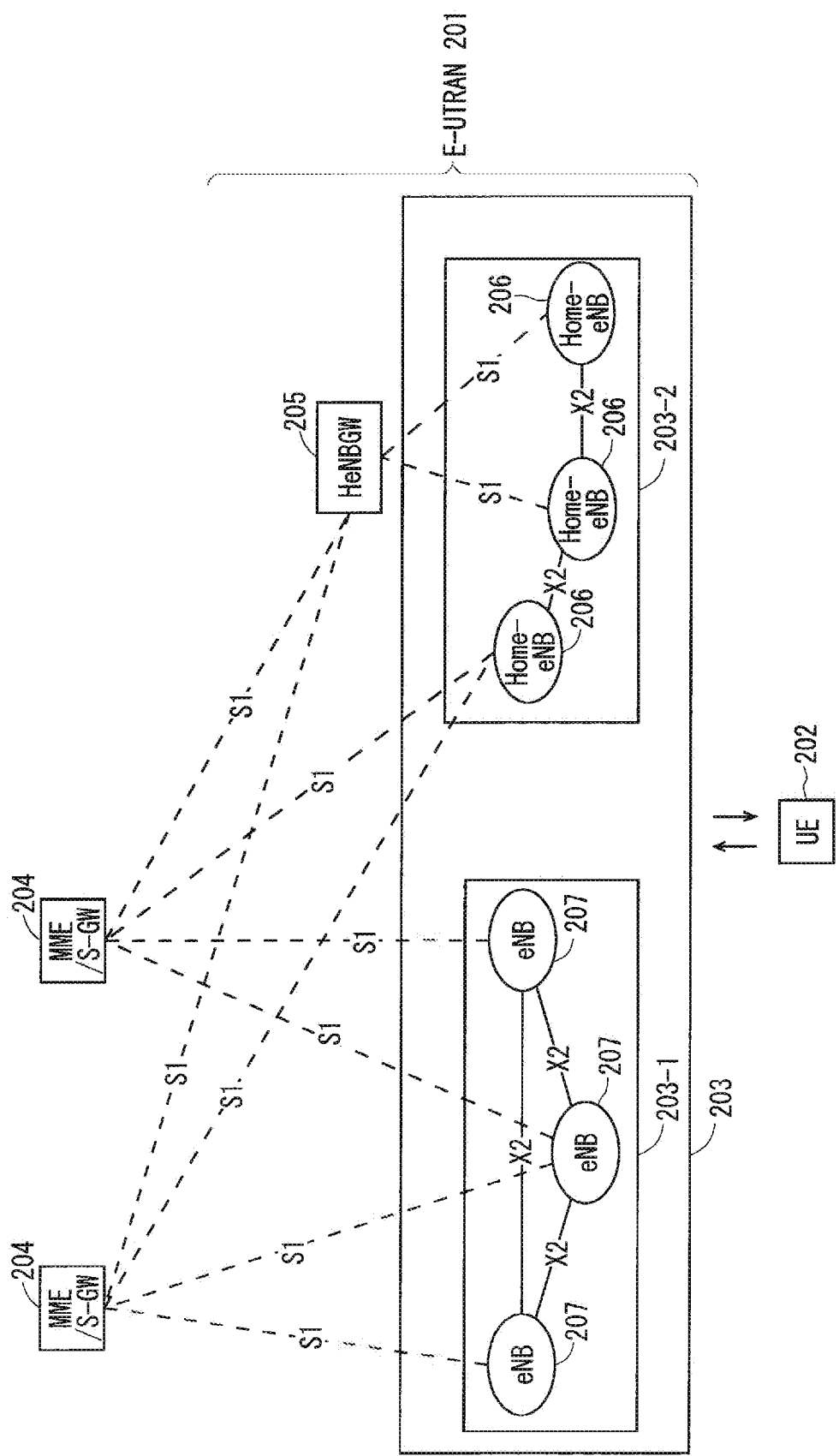
F I G . 2

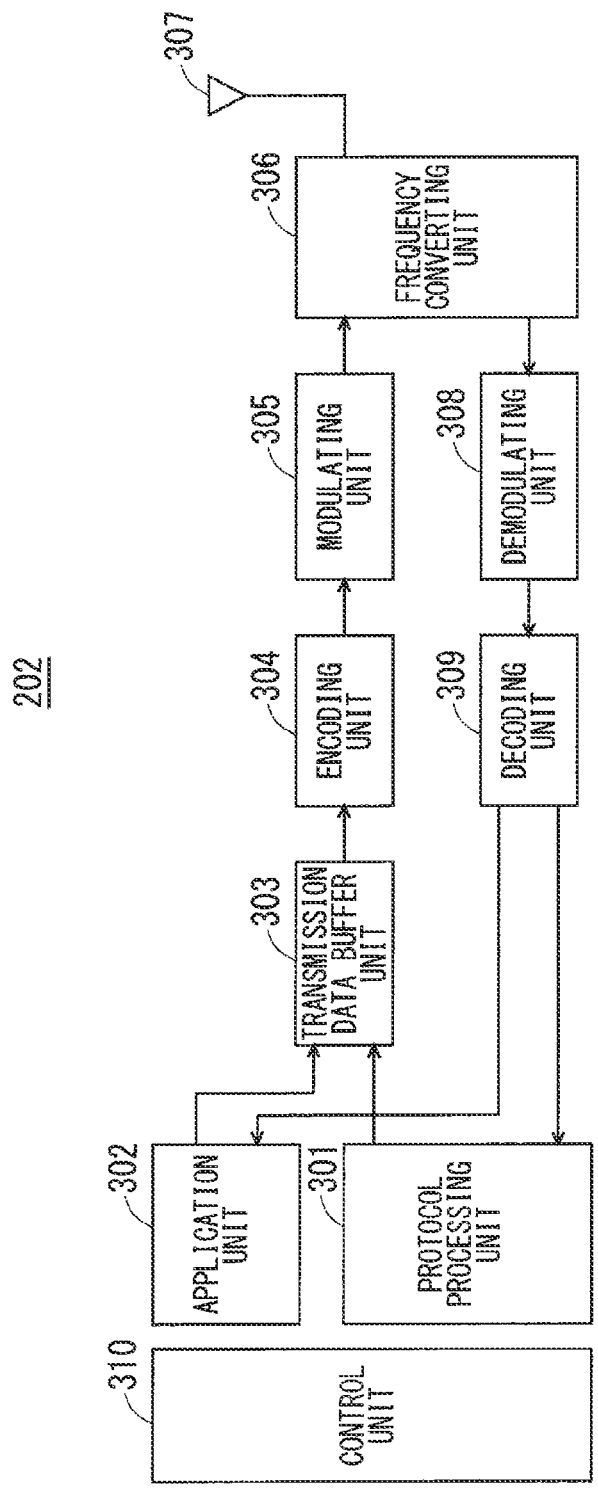

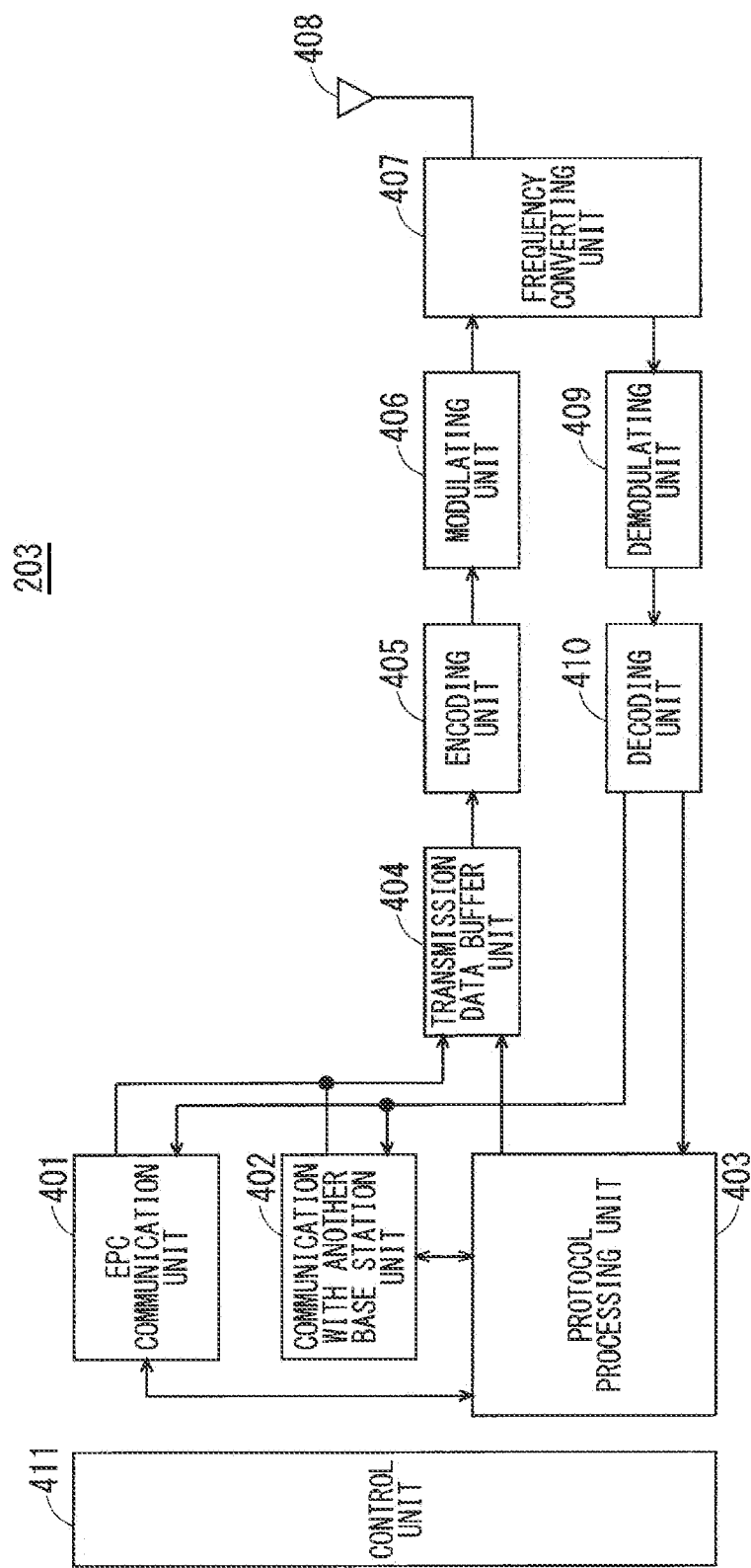

F I G. 5
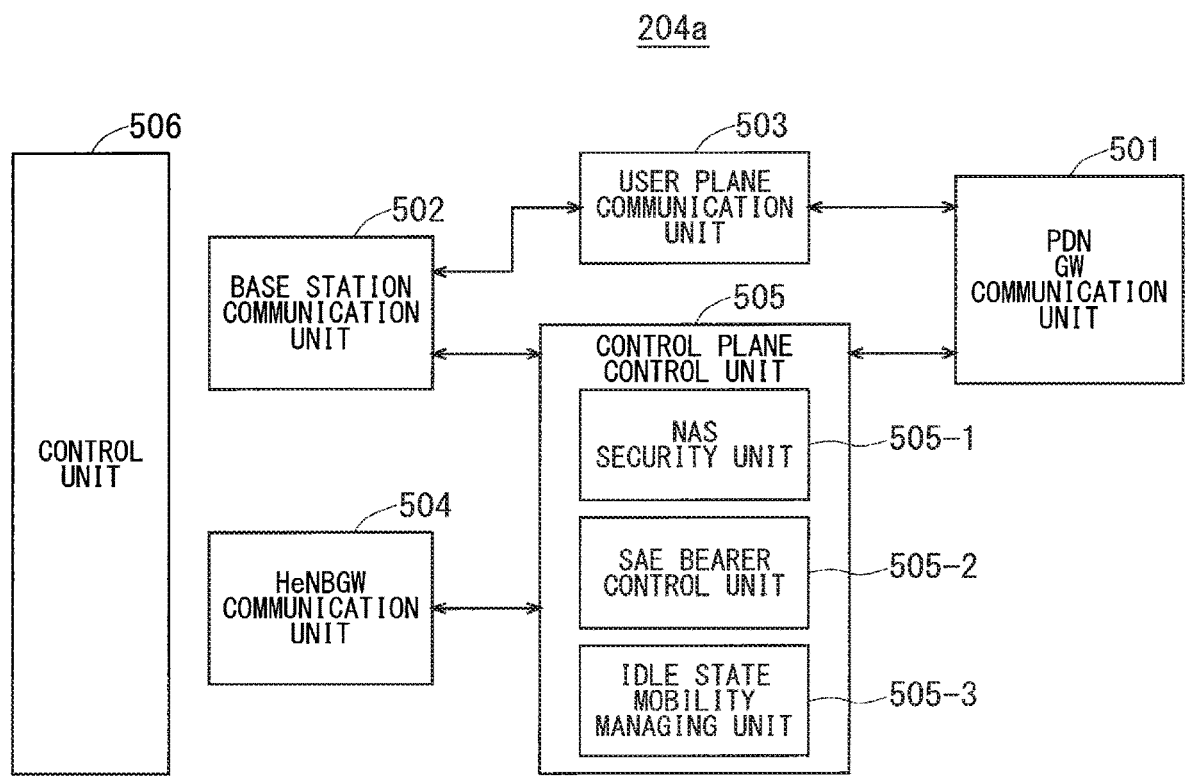

F I G. 1 6
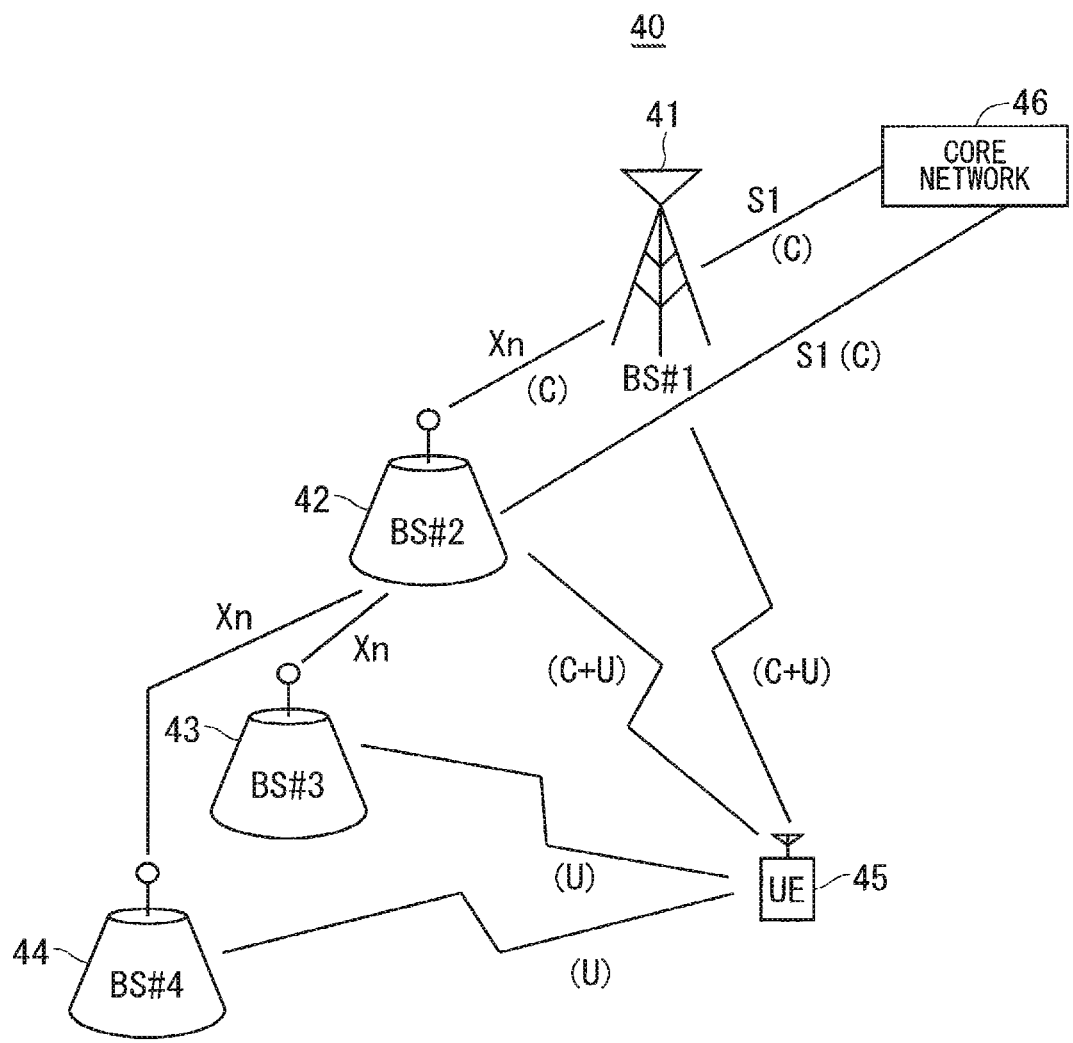

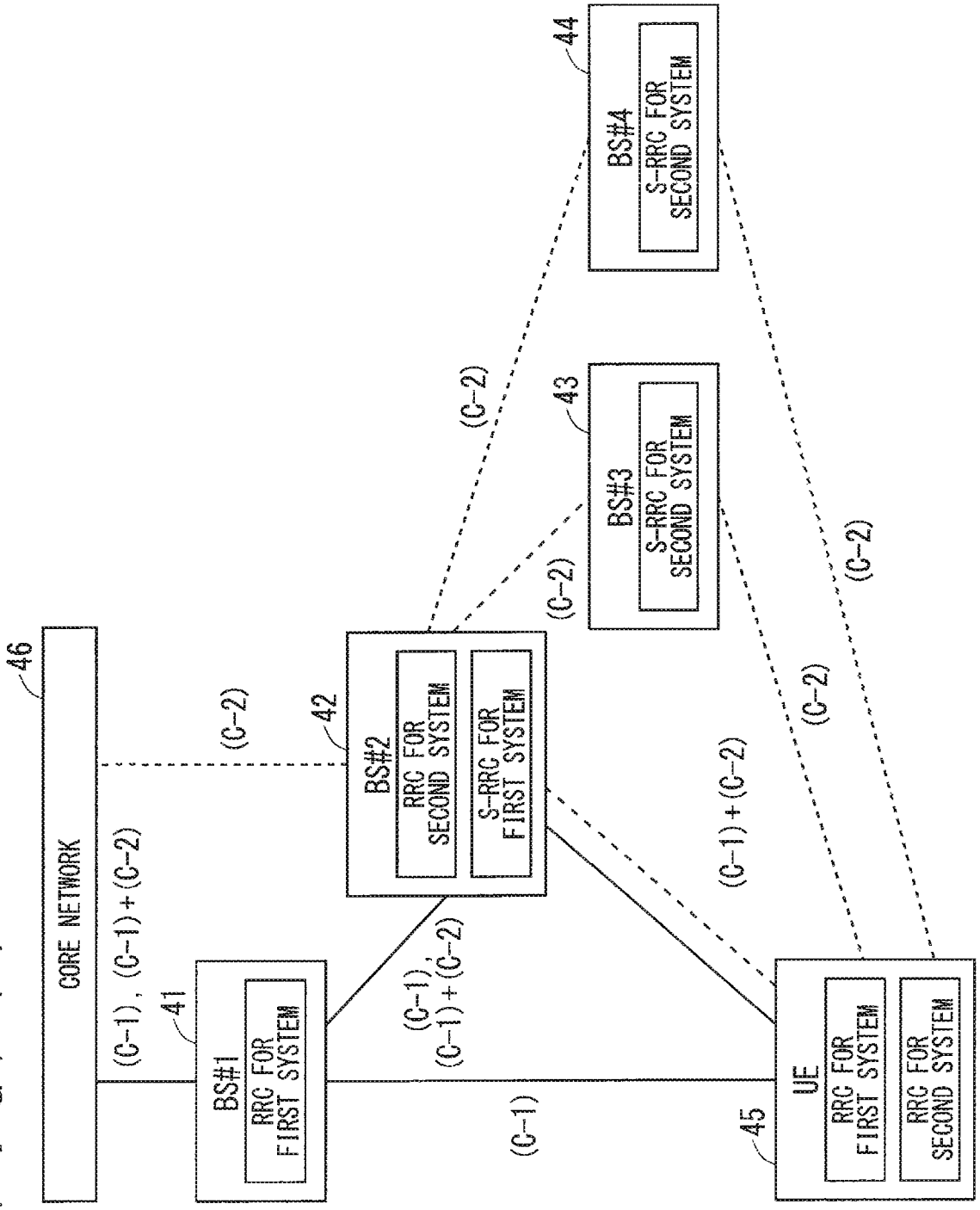

F I G . 3 0
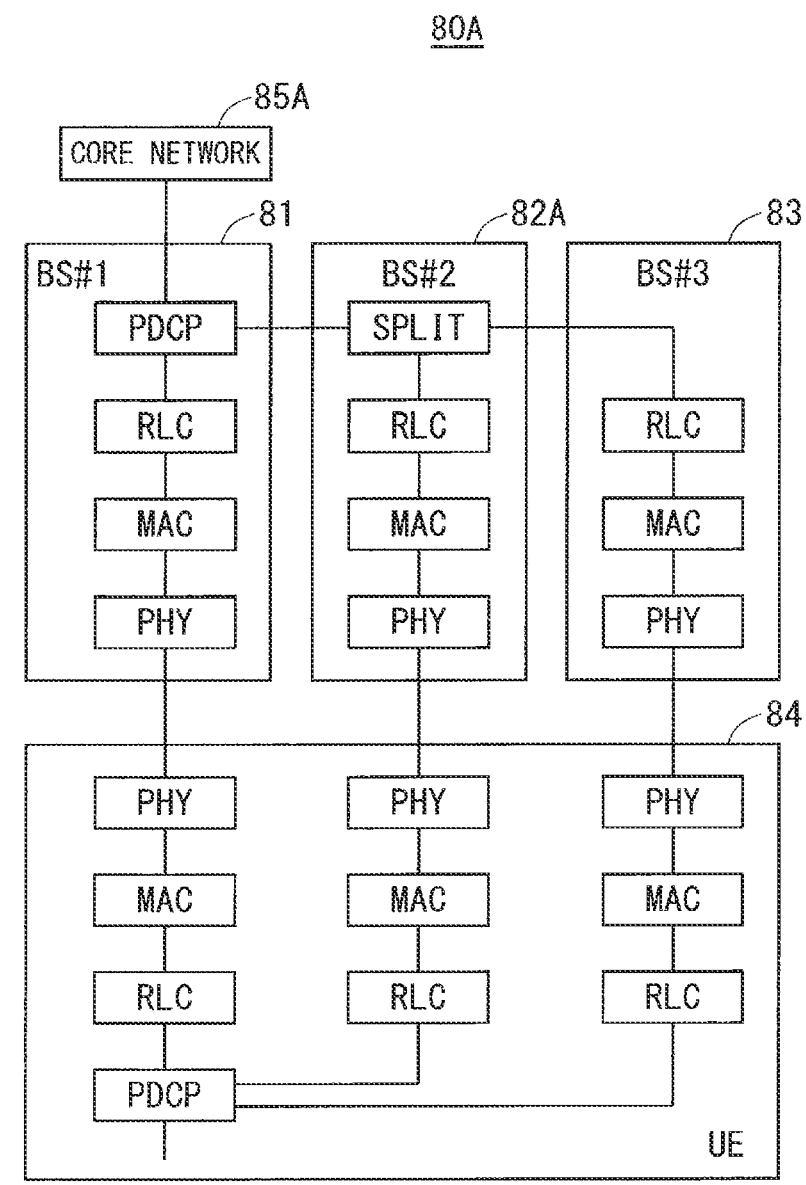

COMMUNICATION SYSTEM

CROSS-REFERENCE TO RELATED APPLICATIONS

This application is a continuation application of and claims the benefit of priority under 35 U.S.C. § 120 for U.S. Ser. No. 16/320,119, filed Jan. 24, 2019, pending, which is a National Stage application of PCT/JP2017/027597, filed Jul. 31, 2017 and claims benefit of priority under 35 U.S.C. § 119 from JP 2016-154272, filed Aug. 5, 2016, the entire contents of each of which are incorporated herein by reference.

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 8). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARD) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARD) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, 3GPP is pursuing specifications standard of long term evolution advanced (LTE-A) as Release 10 (see Non- Patent Documents 3 and 4). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz. Non-Patent Document 1 describes the CA.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

The traffic flow of a mobile network is on the rise, and the communication rate is also increasing. It is expected that the communication rate will be further increased when the operations of the LTE and the LTE-A are fully initiated.

Furthermore, 3GPP is studying the use of small eNBs (hereinafter also referred to as "small-scale base station devices") configuring small cells to satisfy tremendous traffic in the future. In an example technique under study, etc., a large number of small eNBs will be installed to configure a large number of small cells, thus increasing spectral efficiency and communication capacity. The specific techniques include dual connectivity (abbreviated as DC) in which a UE communicates with two eNBs through connection thereto. Non-Patent Document 1 describes the DC.

Among eNBs that perform dual connectivity (DC), one of them may be referred to as a master eNB (abbreviated as MeNB), and the other may be referred to as a secondary eNB (abbreviated as SeNB).

For increasingly sophisticated mobile communications, the fifth generation (hereinafter also referred to as "5G") radio access system is studied, whose service is aimed to be launched in 2020 and afterward. For example, in the Europe, an organization named METIS summarizes the requirements for 5G (see Non-Patent Document 5).

Among the requirements in the 5G radio access system are a system capacity 1000 times as high as, a data transmission rate 100 times as high as, a data latency one tenth (1/10) as low as, and simultaneously connected communication terminals 100 times as many as those in the LTE system, to further reduce the power consumption and device cost.

To satisfy such requirements, increasing the transmission capacity of data using broadband frequencies, and increasing the transmission rate of data through increase in the spectral efficiency are being studied. To realize these, the techniques enabling the spatial multiplexing such as the Multiple Input Multiple Output (MIMO) and the beamforming using a multi-element antenna are being studied.

The MIMO is continuously studied also in LTE-A. From Release 13, full dimension (FD)-MIMO is studied as the extension of the MIMO, which uses two-dimensional antenna array. Non-Patent Document 7 describes the FD-MIMO.

It is studied that the 5G radio access system will be installed concurrently with the LTE system in the initial period of the launch of its service, which is scheduled in 2020. The following configuration is considered. Specifically, a base station for the LTE system (hereinafter may be referred to as an "LTE base station") and a base station for the 5G radio access system (hereinafter may be referred to as a "5G base station") are connected using the dual connectivity (DC) configuration, and the LTE base station is used as an MeNB and the 5G base station as an SeNB.

In this configuration, it is considered that the LTE base station, which has a larger cell range, processes control plane (C-plane) data, and the LTE base station and the 5G base station process user plane (U-plane) data. Non-Patent Document 8 describes an example of this configuration.

PRIOR ART DOCUMENTS

Non-Patent Documents

Non-Patent Document 1: 3GPP TS 36.300 V13.0.0
Non-Patent Document 2: 3GPP S1-083461
Non-Patent Document 3: 3GPP TR 36.814 V9.0.0
Non-Patent Document 4: 3GPP TR 36.912 V10.0.0
Non-Patent Document 5: "Scenarios, requirements and KPIs for 5G mobile and wireless system", [online], Apr. 30, 2013, ICT-317669-METIS/D1.1, [Searched on Jul. 15, 2016], Internet <https://www.metis2020.com/documents/deliverables/>
Non-Patent Document 6: 3GPP TS36.211 V13.0.0
Non-Patent Document 7: 3GPP TR36.897 V13.0.0
Non-Patent Document 8: 3GPP R2-163702

SUMMARY

Problem to be Solved by the Invention

A DC configuration of using an LTE base station as an MeNB and a 5G base station as an SeNB is considered for a case when the 5G radio access system is introduced and a plurality of 5G base stations are installed in one location. In this case, the LTE base station needs to process pieces of control plane (C-plane) data of the plurality of 5G base stations.

In addition, when the split bearer configuration is employed, in which a packet data convergence protocol (PDCP) is collected in the MeNB, there is also a problem concerning processing of user plane (U-plane) data as follows. That is, since the data amount of a 5G base station is large, the load on an LTE base station due to processing is increased when a plurality of 5G base stations as SeNBs are connected to an LTE base station as an MeNB.

The present invention has an object to provide a communication system capable of simplifying processing of at least one of control plane data and user plane data when a communication terminal device communicates with a plurality of base station devices.

Means to Solve the Problem

A communication system according to the present invention includes a communication terminal device, a plurality of base station devices, and a core network. The plurality of base station devices are configured to perform radio communication with the communication terminal device. The core network is configured to provide information about the communication with the communication terminal device to the plurality of base station devices. The plurality of base station devices include a master base station device configured to perform main processing, and a plurality of secondary base station devices to be connected to the master base station device. At least one of control plane data about control of the communication and user plane data about a user is transmitted to and received from the communication terminal device via the master base station device. The control plane data and the user plane data are contained in the information provided by the core network about the communication with the communication terminal device.

Effects of the Invention

According to the communication system of the present invention, at least one of control plane data about control of communication and user plane data about a user is transmitted to and received from a communication terminal device via a master base station device. The control plane data and the user plane data are contained in information provided by a core network about communication with the communication terminal device. This configuration simplifies processing of at least one of control plane data and user plane data when the communication terminal device communicates with a plurality of base station devices.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 2 is a block diagram showing the overall configuration of an LTE communication system 200 under discussion of 3GPP.

FIG. 3 is a block diagram showing the configuration of a user equipment 202 shown in FIG. 2, which is a communication terminal according to the present invention.

FIG. 4 is a block diagram showing the configuration of a base station 203 shown in FIG. 2, which is a base station according to the present invention.

FIG. 5 is a block diagram showing the configuration of an MME according to the present invention.

FIG. 16 is a diagram showing the configuration of a communication system 40 according to a first modification of the first embodiment of the present invention.

FIG. 17 is a diagram showing one example of the flow of data in the communication system 40 according to the first modification of the first embodiment of the present invention.

FIG. 30 is a block diagram showing the configuration of a communication system 80A as another example of the communication system according to the third embodiment of the present invention.

DESCRIPTION OF EMBODIMENTS

First Embodiment

Figure 6:
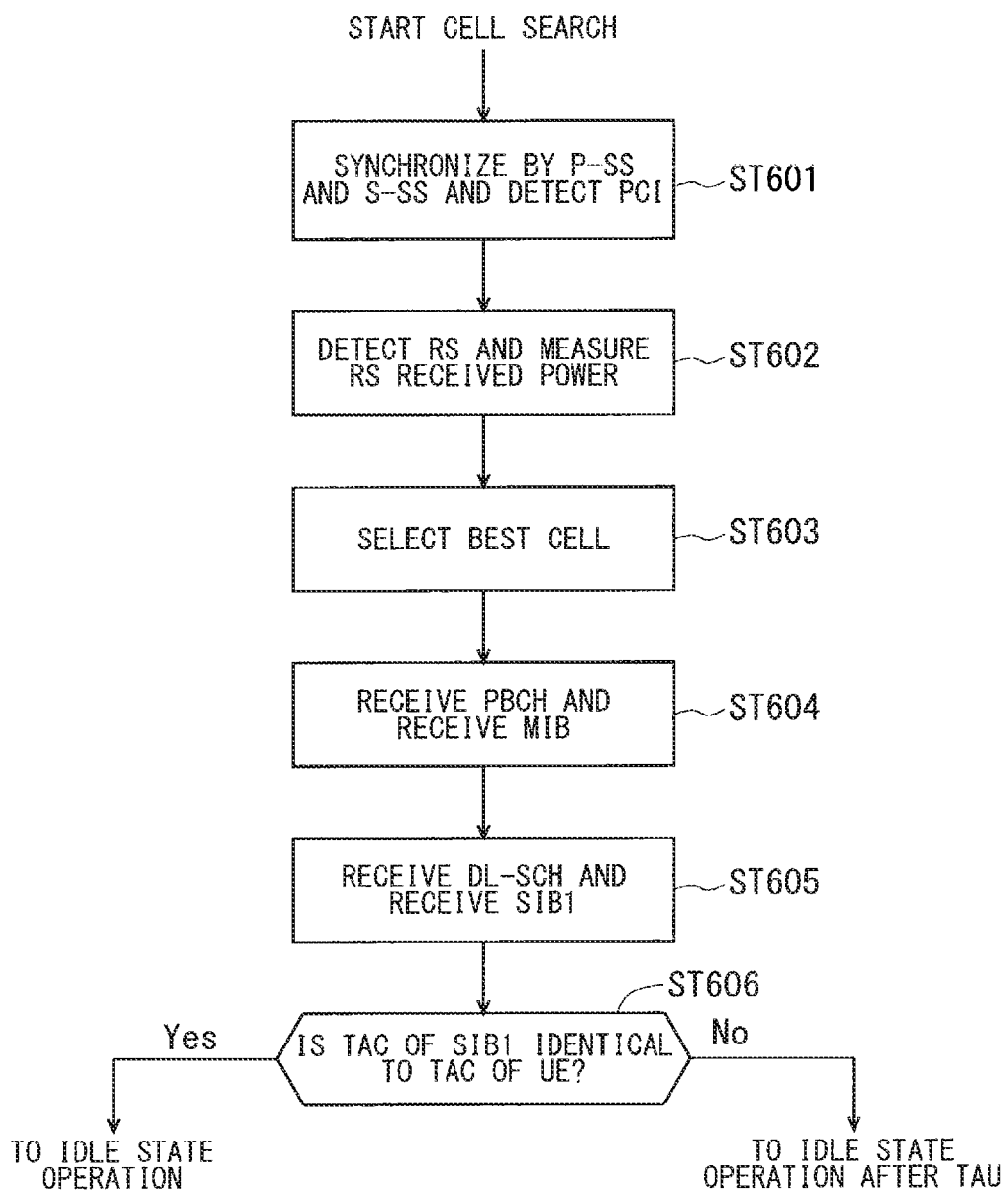
FIG. 6 is a flowchart showing an outline from a cell search to an idle state operation performed by a communication terminal (UE) in the LTE communication system.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (abbreviated as RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station 203 may configure a single cell or a plurality of cells. Each cell has a range predetermined as a coverage in which the cell can communicate with the user equipment 202 and performs radio communication with the user equipment 202 within the coverage. In the case where one base station 203 configures a plurality of cells, every cell is configured so as to communicate with the user equipment 202.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
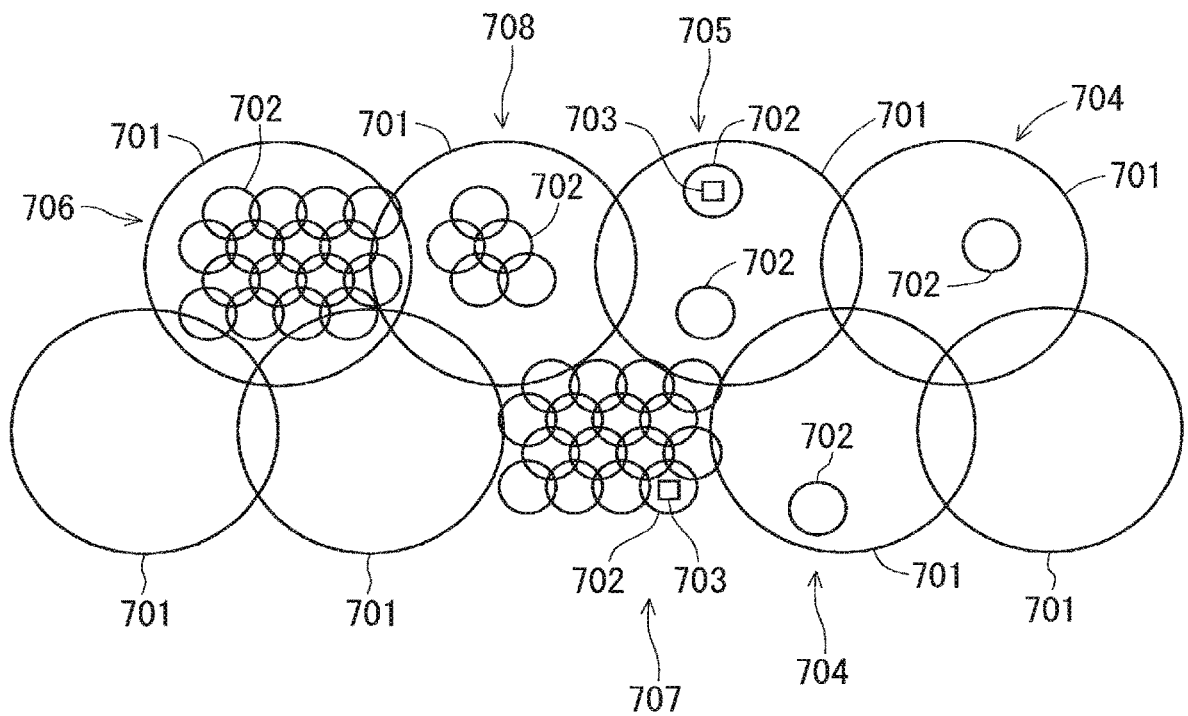
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

In the fifth generation (5G), which is a forthcoming radio access system aimed to be commercialized in 2018 to 2020, an architecture of concurrently installing an LTE base station for the LTE-A system and a 5G base station for the 5G system is considered.

In LTE-A, the configuration of dual connectivity (abbreviated as DC) establishes a master-subordinate relationship of a master eNB (MeNB) and a secondary eNB (SeNB) between two base stations. The MeNB corresponds to a master base station device, and the SeNB corresponds to a secondary base station device. It is considered that the control plane (C-plane) data is processed solely by the MeNB, and the user plane (U-plane) data is processed by the MeNB and the SeNB.

Figure 8:
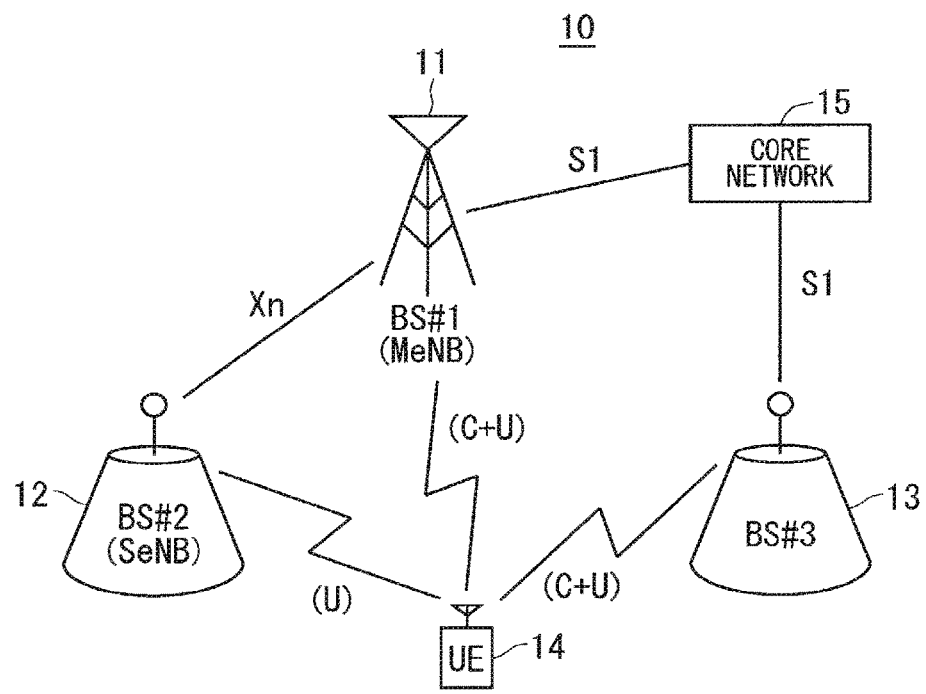
FIG. 8 is a diagram showing the configuration of a conventional communication system 10.

FIG. 8 is a diagram showing the configuration of a conventional communication system 10. A first base station 11 (hereinafter may be referred to as a "BS #1") as an MeNB is connected to a core network 15 by means of an S1 interface, and is connected to a second base station 12 (hereinafter may be referred to as a "BS #2") as an SeNB by means of an Xn interface. A third base station 13 (hereinafter may be referred to as a "BS #3"), which is installed independently of other base stations, is connected to the core network 15 by means of the S1 interface.

In 5G, in addition to LTE-A, a plurality of base stations using different frequencies are connected. Further, the data amount of each base station is also large.

In view of this, a configuration of using LTE-A for the MeNB 11 is considered. The reason is that LTE-A can cover a relatively wide cell radius. Specifically, the reason is that LTE-A can cover a cell in a relatively wide range in a plan view due to its use of low frequencies as well as a large number of already installed base stations present because those base stations are the existing base stations.

A base station of the 5G radio system is allocated to the SeNB 12. In this case, it is likely that a base station (hereinafter may be referred to as a "low SHF base station") that uses low super high frequency (SHF) of frequencies of 6 GHz or lower and a base station (hereinafter may be referred to as a "high SHF base station") that uses high SHF of frequencies exceeding 6 GHz are installed concurrently.

In this case, the DC configuration allows only a single SeNB 12, e.g., only a single low SHF base station, to be allocated to one MeNB 11. Another base station, e.g., a high SHF base station, is only allowed to be installed as a standalone base station 13 that is independent of other base stations. That is, a configuration in which a single MeNB 11 is connected to a plurality of SeNBs 12 is not possible.

Accordingly, even when a user equipment (hereinafter may be referred to as a "UE") 14 is capable of concurrently communicating with three or more base stations, communication paths for pieces of control plane (C-plane) information cannot be integrated into one. Therefore, control is required such that mismatch between a plurality of pieces of control plane (C-plane) information does not occur in the UE 14.

Further, even if a plurality of SeNBs 12 are connected, pieces of control plane (C-plane) information are concentrated at a single MeNB 11, which may cause processing capacity of the MeNB 11 to be a bottleneck in the network.

The present embodiment has a configuration in which a single base station corresponding to an MeNB is capable of executing processing of pieces of control plane (C-plane) data of a plurality of base stations that are connected as SeNBs. Further, the present embodiment has a configuration in which a single base station corresponding to an MeNB is also similarly capable of executing processing of pieces of user plane (U-plane) data.

That is, in the present embodiment, control plane (C-plane) data about control of communication, which is contained in information provided by the core network about communication with the UE, is transmitted to and received from the UE via a single base station corresponding to an MeNB. This can simplify processing of control plane (C-plane) data performed by a communication terminal capable of concurrently communicating with a plurality of base stations.

Figure 9:
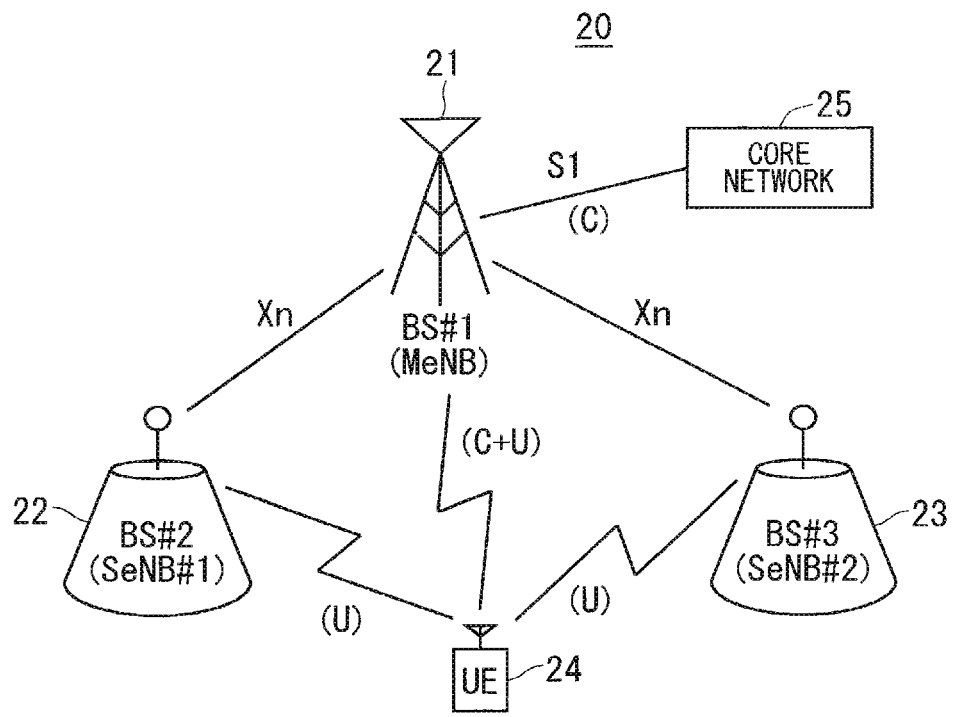
FIG. 9 is a diagram showing the configuration of a communication system 20 according to a first embodiment of the present invention.

FIG. 9 is a diagram showing the configuration of a communication system 20 according to a first embodiment of the present invention. The communication system 20 includes a first base station 21 (hereinafter may be referred to as a "BS #1"), a second base station 22 (hereinafter may be referred to as a "BS #2"), a third base station 23 (hereinafter may be referred to as a "BS #3"), and a user equipment (UE) 24. The BS #1 is installed as an MeNB. The BS #2 is installed as a first SeNB (hereinafter may be referred to as a "SeNB #1"). The BS #3 is installed as a second SeNB (hereinafter may be referred to as a "SeNB #2").

The MeNB corresponds to a master base station device. The master base station device performs main processing. The main processing is, for example, aggregation processing of the dual connectivity (DC). The first SeNB and the second SeNB each correspond to a secondary base station device. The first SeNB and the second SeNB are each connected to the MeNB.

A single UE 24 concurrently communicates with the three base stations 21 to 23, i.e., the BS #1, the BS #2, and the BS #3. Concerning the three base stations, for example, the BS #1 is considered to be a base station of LTE-A, the BS #2 to be a base station of 5G, and the BS #3 to be a base station of 5G. An interface allowing direct communication, i.e., an Xn interface in this case, is provided between the BS #1 and the BS #2 and also between the BS #1 and the BS #3.

The UE 24 communicates control plane (C-plane) data with the BS #1. Further, the UE 24 communications user plane (U-plane) data with each of the BS #1, the BS #2, and the BS #3.

Figure 10:
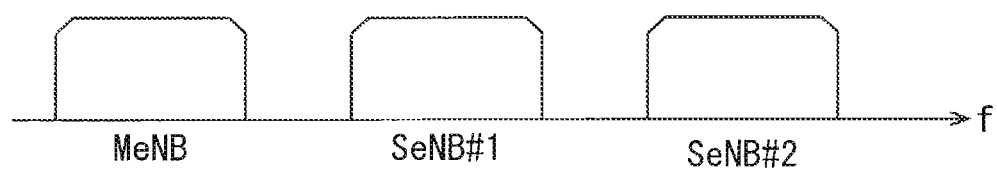
FIG. 10 is a diagram showing one example of frequencies of transmission and reception waves used by the communication system 20 according to the first embodiment of the present invention.

FIG. 10 is a diagram showing one example of frequencies of transmission and reception waves used by the communication system 20 according to the first embodiment of the present invention. In FIG. 10, the horizontal axis represents frequency f. In the present embodiment, for example, as shown in FIG. 10, the first base station 21 installed as an MeNB, the second base station 22 installed as an SeNB #1, and the third base station 23 installed as an SeNB #2 use transmission and reception waves of different frequency bands.

Figure 11:
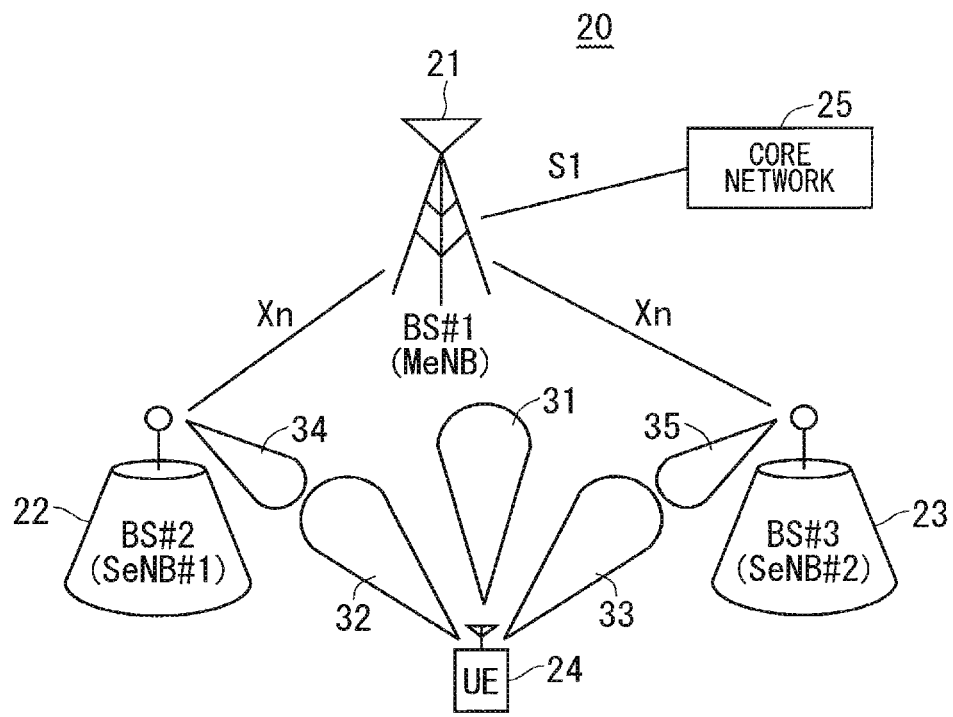
FIG. 11 is a diagram showing one example of transmission and reception waveforms used by the communication system 20 according to the first embodiment of the present invention.
Figure 12:
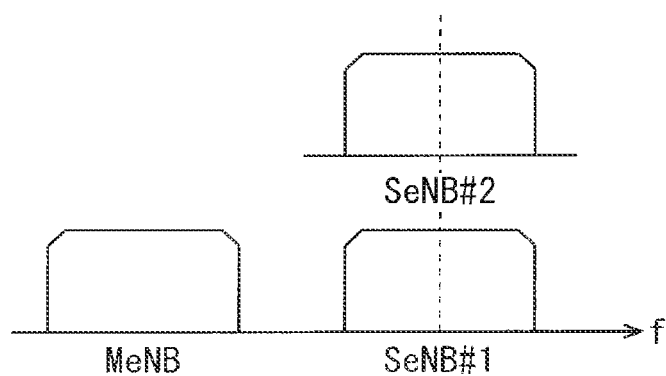
FIG. 12 is a diagram showing one example of frequencies of transmission and reception waves used in the example shown in FIG. 11.

FIG. 11 is a diagram showing one example of transmission and reception waveforms used by the communication system 20 according to the first embodiment of the present invention. FIG. 12 is a diagram showing one example of frequencies of transmission and reception waves used in the example shown in FIG. 11. FIG. 11 and FIG. 12 show a case where the base stations 22 and 23 and the UE 24 each use an array antenna as their transmission and reception antenna. In this case, as shown in FIG. 11, beam-shaped transmission and reception waveforms 31 to 35 having directivity are used. This configuration can improve spatial separation.

Accordingly, as shown in FIG. 12, a plurality of base stations can be concurrently allocated to the same frequency band. In the example shown in FIG. 12, one MeNB and two SeNBs use transmission and reception waves of different frequency bands, while the SeNB #1 and the SeNB #2 use transmission and reception waves of the same frequency band.

Figure 13:
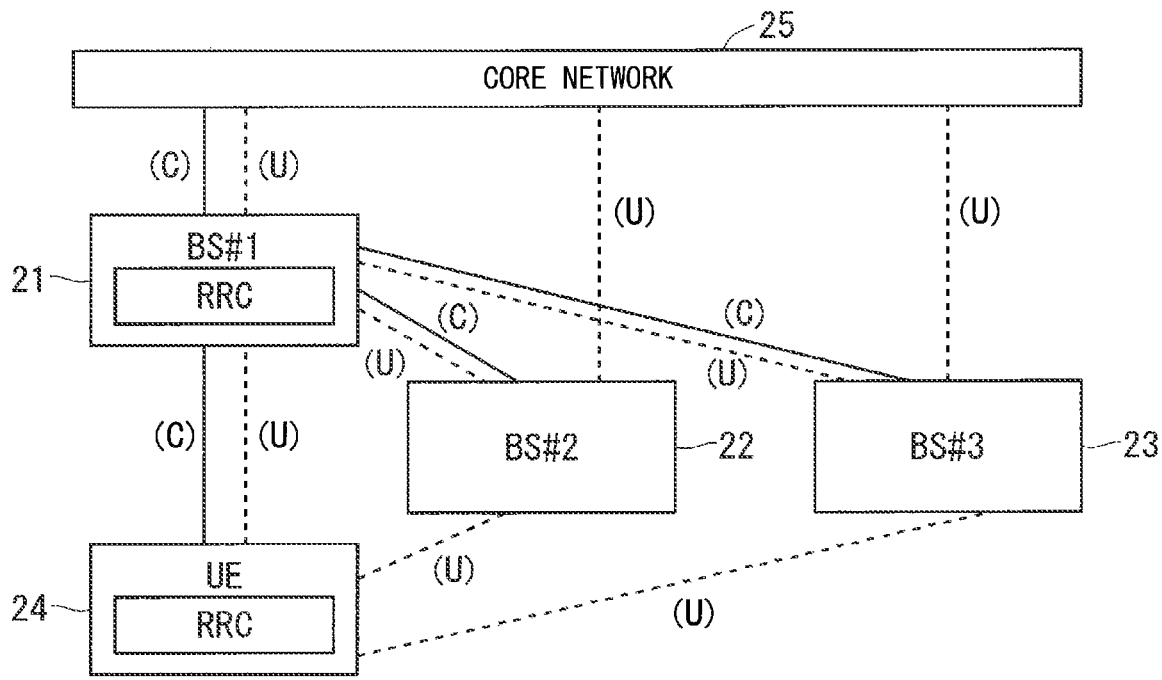
FIG. 13 is a diagram showing one example of the flow of data in the communication system 20 according to the first embodiment of the present invention.

FIG. 13 is a diagram showing one example of the flow of data in the communication system 20 according to the first embodiment of the present invention. As shown in FIG. 13, for example, user plane (U-plane) data is transmitted and received through communication between a core network device 25 as an upper layer device (a next generation core network) and each of the base stations, i.e., the first base station 21 (hereinafter may be referred to as a "BS #1"), the second base station (hereinafter may be referred to as a "BS #2"), and the third base station (hereinafter may be referred to as a "BS #3"), and is also transmitted and received through communication between each of the base stations and the UE 24.

The user plane (U-plane) data is not limited thereto, and may be transmitted and received through communication between one base station, e.g., the BS #1, and the core network device 25 as an upper layer device, through communication between the BS #1 and the UE 24, and through communication between the BS #1 and the UE 24 via the BS #2 or BS #3.

In the present embodiment, control plane (C-plane) data is transmitted and received only through communication between the BS #1 and the UE 24. The communication between the BS #1 and the UE 24 may be performed as direct communication between the BS #1 and the UE 24, or may be performed via another base station, such as the BS #3 or the BS #4.

Figure 14:
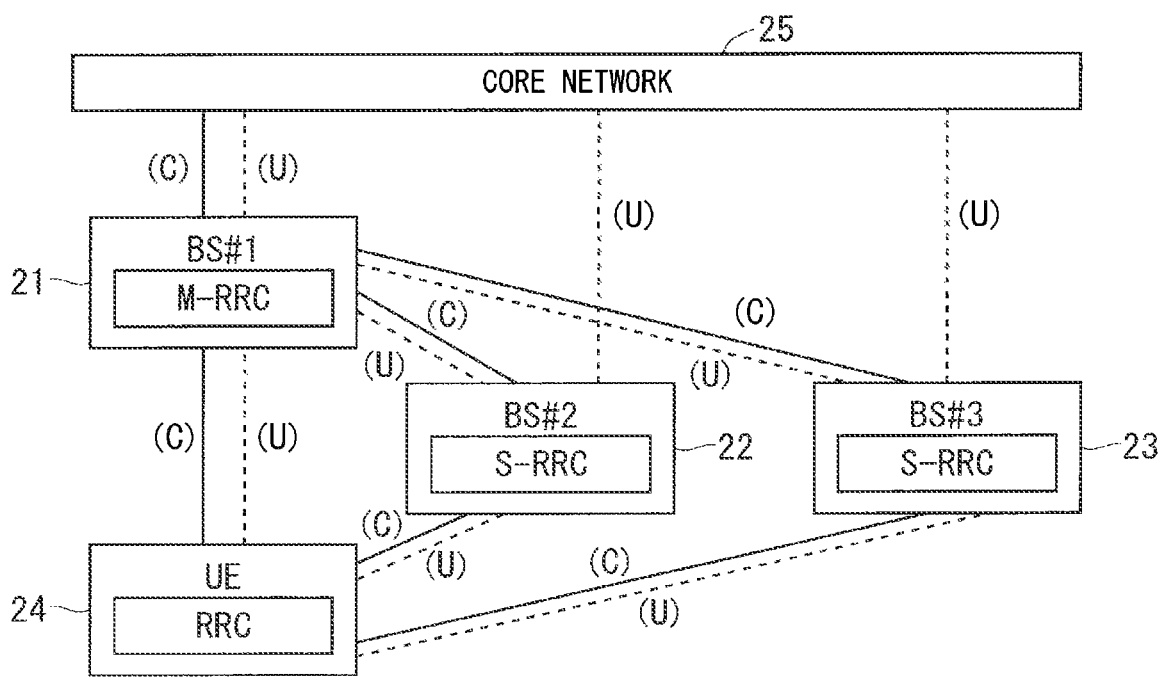
FIG. 14 is a diagram showing one example of the flow of data in a communication system 20A as another example of the communication system according to the first embodiment of the present invention.

FIG. 14 is a diagram showing one example of the flow of data in a communication system 20A as another example of the communication system according to the first embodiment of the present invention. The communication system 20A shown in FIG. 14 includes the same components as those of the communication system 20 shown in FIG. 13, and therefore the same components are denoted by the same reference symbols to omit common description.

As shown in FIG. 14, control plane (C-plane) data is transmitted and received through communication between the core network device 25 corresponding to an MME and the BS #1.

The control plane (C-plane) data may be transmitted and received through communication between the BS #1 and the UE 24. Further, as shown in FIG. 14, the control plane (C-plane) data may be transmitted and received through communication with the UE 24 via radio resources of the BS #2 and the BS #3, in addition to the communication between the BS #1 and the UE 24.

Figure 15:
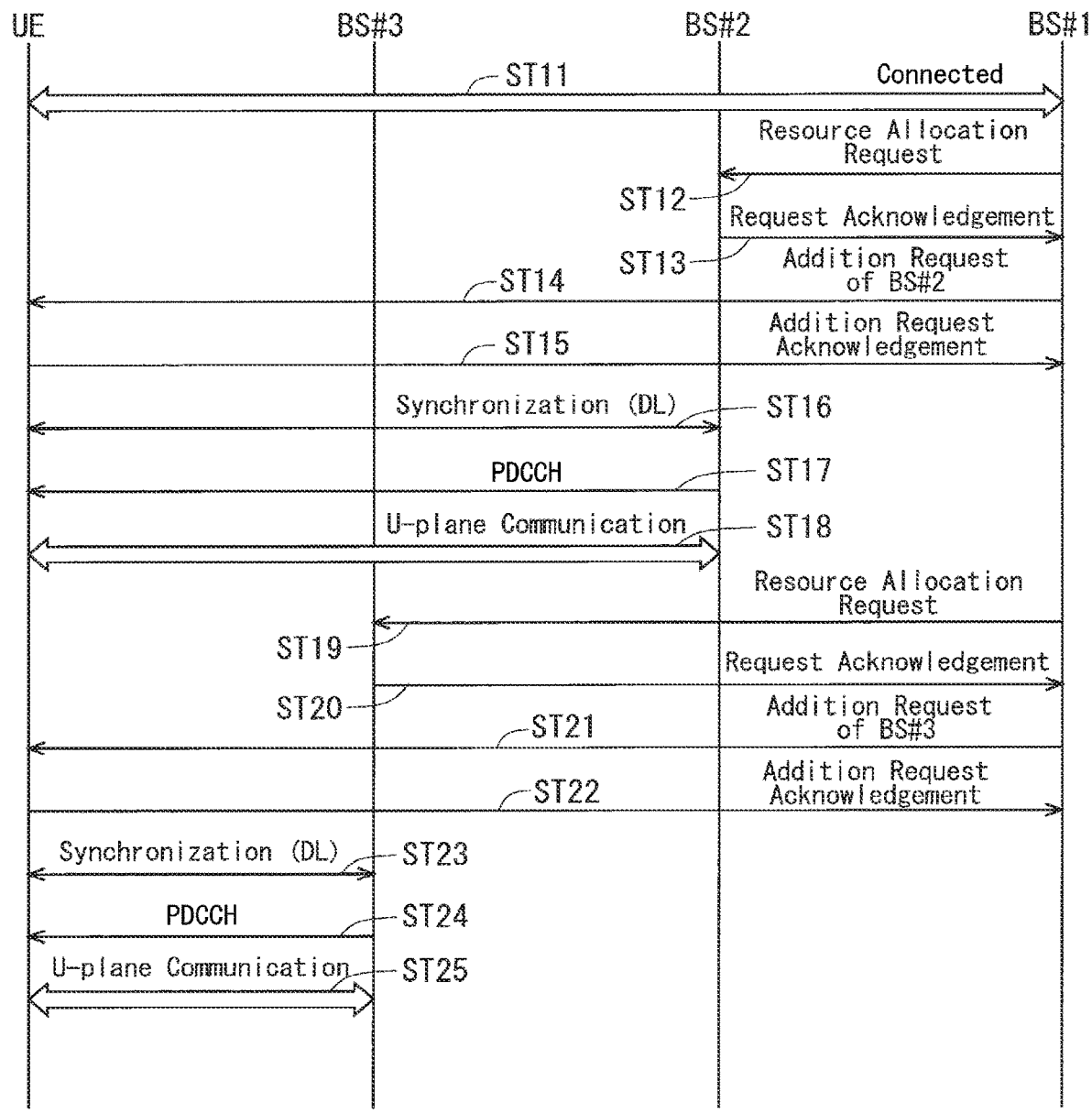
FIG. 15 is a diagram showing one example of a sequence of processing before the start of communication in the communication system according to the first embodiment of the present invention.

FIG. 15 is a diagram showing one example of a sequence of processing before the start of communication in the communication system according to the first embodiment of the present invention. FIG. 15 shows a sequence of adding the BS #2 and the BS #3 in a state where the BS #1 and the UE are connected.

In Step ST11, the BS #1, the BS #2, the BS #3, and the UE are connected.

In Step ST12, the BS #1 notifies the BS #2 of a resource allocation request. In Step ST13, the BS #2 notifies the BS #1 of a request acknowledgement.

In Step ST14, the BS #1 notifies the UE of an addition request of the BS #2. In Step ST15, the UE notifies the BS #1 of an addition request acknowledgement. The UE measures a specified synchronization signal of the BS #2.

In Step ST16, the UE synchronizes with a downlink (DL) of the BS #2.

In Step ST17, the BS #2 notifies the UE of channel control, such as a PDCCH.

In Step ST18, the UE starts communication of user plane (U-plane) data based on a resource allocation condition of the downlink signal specified by the PDCCH.

In Step ST19, the BS #1 notifies the BS #3 of a resource allocation request. In Step ST20, the BS #3 notifies the BS #1 of a request acknowledgement.

In Step ST21, the BS #1 notifies the UE of an addition request of the BS #3. In Step ST22, the UE notifies the BS #1 of an addition request acknowledgement. The UE measures a specified synchronization signal of the BS #3.

In Step ST23, the UE synchronizes with a downlink (DL) of the BS #3.

In Step ST24, the BS #3 notifies the UE of channel control, such as a PDCCH.

In Step ST25, the UE starts communication of user plane (U-plane) data based on a resource allocation condition of the downlink signal specified by the PDCCH.

Deletion of a base station is executed similarly. Deletion is executed based on a deletion command of the BS #1 transmitted to the UE.

UEs and base stations compatible with the 5G standard may use an array antenna as their transmission and reception antenna. In such a case, the use of beam-shaped transmission and reception waveforms having directivity can improve spatial separation. Accordingly, a plurality of base stations may be concurrently allocated to the same frequency band as shown in FIG. 13.

When beams are used, information as to which beam should be selected, such as a beam ID, may be in some cases added to the addition request signal of the BS #2 in Step ST14 and to the addition request signal of the BS #3 in Step ST21 of FIG. 15. In such a case, a beam for receiving PDCCH can be selected, and thus the PDCCH information need not be transmitted via all of the beams, which can lead to efficient use of channel resources.

Alternatively, information as to the selection of a beam can be added to the PDCCH. In such a case, the BS #1 need not consider beam control. Accordingly, when a plurality of base stations are connected to the BS #1, resource allocation processing of the BS #1 is reduced, and the processing load can be distributed as a system. Even if the BS #1 is a device having limited processing capacity, e.g., an LTE-A base station, processing can be performed while such limited processing capacity is prevented from turning into a bottleneck.

According to the present embodiment as described above, control plane (C-plane) data contained in information provided by the core network about communication with the UE is transmitted to and received from the UE via the MeNB. This can simplify processing of control plane (C-plane) data when the UE communicates with a plurality of base stations.

Specifically, in the embodiment, the core network provides control plane (C-plane) data to the MeNB. The MeNB then provides the control plane (C-plane) data provided by the core network to the UE, and to the UE also via a plurality of SeNBs. This can simplify processing of control plane (C-plane) data performed by a UE capable of concurrently communicating with a plurality of base stations.

First Modification of First Embodiment

As a first modification of the first embodiment, there is a configuration in which part of processing of control plane (C-plane) data is distributed to a base station other than the MeNB, e.g., to a BS #2 described below. FIG. 16 is a diagram showing the configuration of a communication system 40 according to a first modification of the first embodiment of the present invention. The communication system 40 includes a first base station 41 (hereinafter may be referred to as a "BS #1"), a second base station 42 (hereinafter may be referred to as a "BS #2"), a third base station 43 (hereinafter may be referred to as a "BS #3"), a fourth base station 44 (hereinafter may be referred to as a "BS #4"), a user equipment (UE) 45, and a core network 46.

The present modification shows a case where the BS #1 is a base station for LTE-A, and the BS #2, the BS #3, and the BS #4 are each a base station for 5G. RRC messages for the 5G standard are characterized in being transmitted and received collectively by the BS #2.

The BS #1 and the BS #2 are connected by means of an interface between base stations, specifically an Xn interface. Further, the BS #2 and the BS #3 as well as the BS #2 and the BS #4 are connected by means of an interface between base stations, specifically an Xn interface. The BS #1 and the core network 46 are connected by means of an S1 interface.

The BS #1 handles RRC messages for the BS #1, and control plane (C-plane) information for adding the BS #2.

Meanwhile, the BS #2 handles control plane (C-plane) information for the BS #2, the BS #3, and the BS #4. The UE 45 transmits and receives the control plane (C-plane) information to and from the BS #1 and the BS #2.

Adopting the configuration shown in FIG. 16, the BS #1 no longer needs to handle RRC messages of a new system such as 5G. Therefore, even in a system configuration where a new system such as 5G is connected, a new system can be easily introduced.

FIG. 17 is a diagram showing one example of the flow of data in the communication system 40 according to the first modification of the first embodiment of the present invention. FIG. 17 shows an example of a layout of RRC processing functions. The BS #1 employs a first radio system (hereinafter may be referred to as a "first system") of LTE-A, for example. The BS #2, the BS #3, and the BS #4 each employ a second radio system (hereinafter may be referred to as a "second system") of 5G, for example.

The BS #1 has a function of RRC processing for the first system. The BS #2 has a function of RRC processing for the second system. The RRC messages for the first system may be transmitted and received between the BS #1 and the UE, or may be communicated to the UE via a radio resource of the BS #2.

Meanwhile, the BS #2 has a function of RRC processing for the second system. RRC messages for the second system may be transmitted and received between the BS #2 and the UE, or may be communicated to the UE via radio resources of the BS #3 and the BS #4. Control plane (C-plane) information for the second system is transmitted and received through communication between the core network 46 and the BS #2. The communication between the core network 46 and the BS #2 may be performed as direct communication between the core network 46 and the BS #2, or may be performed as communication via the BS #1.

Separating the RRC processing functions for respective radio systems can maintain independency of each of the radio systems. Therefore, influence upon other radio systems can be reduced to the extent possible even when a new system is introduced.

Further, connecting a plurality of base stations with association between radio systems as in the dual connectivity can improve connectivity of a UE, and can smoothly add and delete a cell. The "connectivity of a UE" herein refers to the easiness of connection between a UE and a base station.

Figure 18:
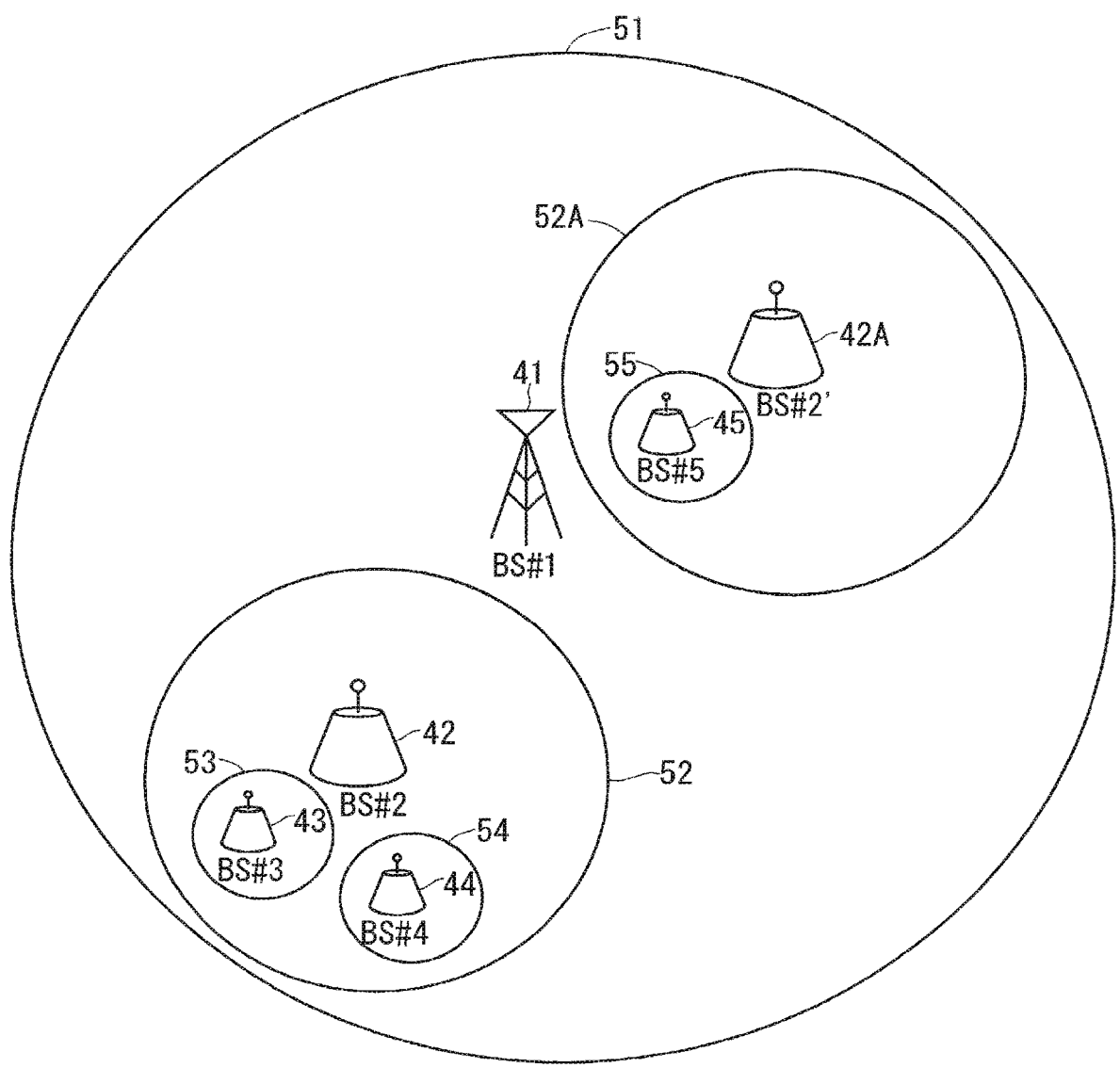
FIG. 18 is a diagram showing one example of a layout of cells in the communication system 40 according to the first modification of the first embodiment of the present invention.

FIG. 18 is a diagram showing one example of a layout of cells in the communication system 40 according to the first modification of the first embodiment of the present invention. The connection between the BS #1 and the UE can be maintained in a wide range in the case as shown in FIG. 18, for example. That is, the BS #1 forms a macro cell 51 having a cell radius of 500 m, for example, the BS #2 forms a micro cell 52 having a cell radius of 200 m, for example, and the BS #3 and the BS #4 respectively form small cells 53 and 54 each having a cell radius of 50 m, for example.

In the example shown in FIG. 18, a BS #2' as another second base station 42A exists in the cell 51 of the BS #1. For example, similarly to the BS #2, the BS #2' forms a micro cell 52A having a cell radius of 200 m. In the cell 52A of the BS #2', a BS #5 as a fifth base station 45 exists. For example, similarly to the BS #3 and the BS #4, the BS #5 forms a small cell 55 having a cell radius of 50 m, for example.

Since such a large number of base stations 42, 42A, and 43 to 45 exist in the cell 51 of the BS #1, the BS #1 is subjected to a large processing load if intending to process, for all of the base stations 42, 42A, and 43 to 45, the pieces of control plane (C-plane) data for a plurality of base stations described in the first embodiment.

In view of this, in the present modification, the BS #2 executes processing of control plane (C-plane) data of the BS #2 and processing of control plane (C-plane) data of the BS #3 and the BS #4 that are base stations running under the cell 52 of the BS #2. This configuration can reduce the load on the BS #1 due to the processing. Further, it is preferable that the BS #2' also executes processing of control plane (C-plane) data of the BS #2' and processing of control place (C-plane) data of the BS #5 that is a base station running under the cell 52A of the BS #2'. This can further reduce the load on the BS #1 due to the processing.

Figure 19:
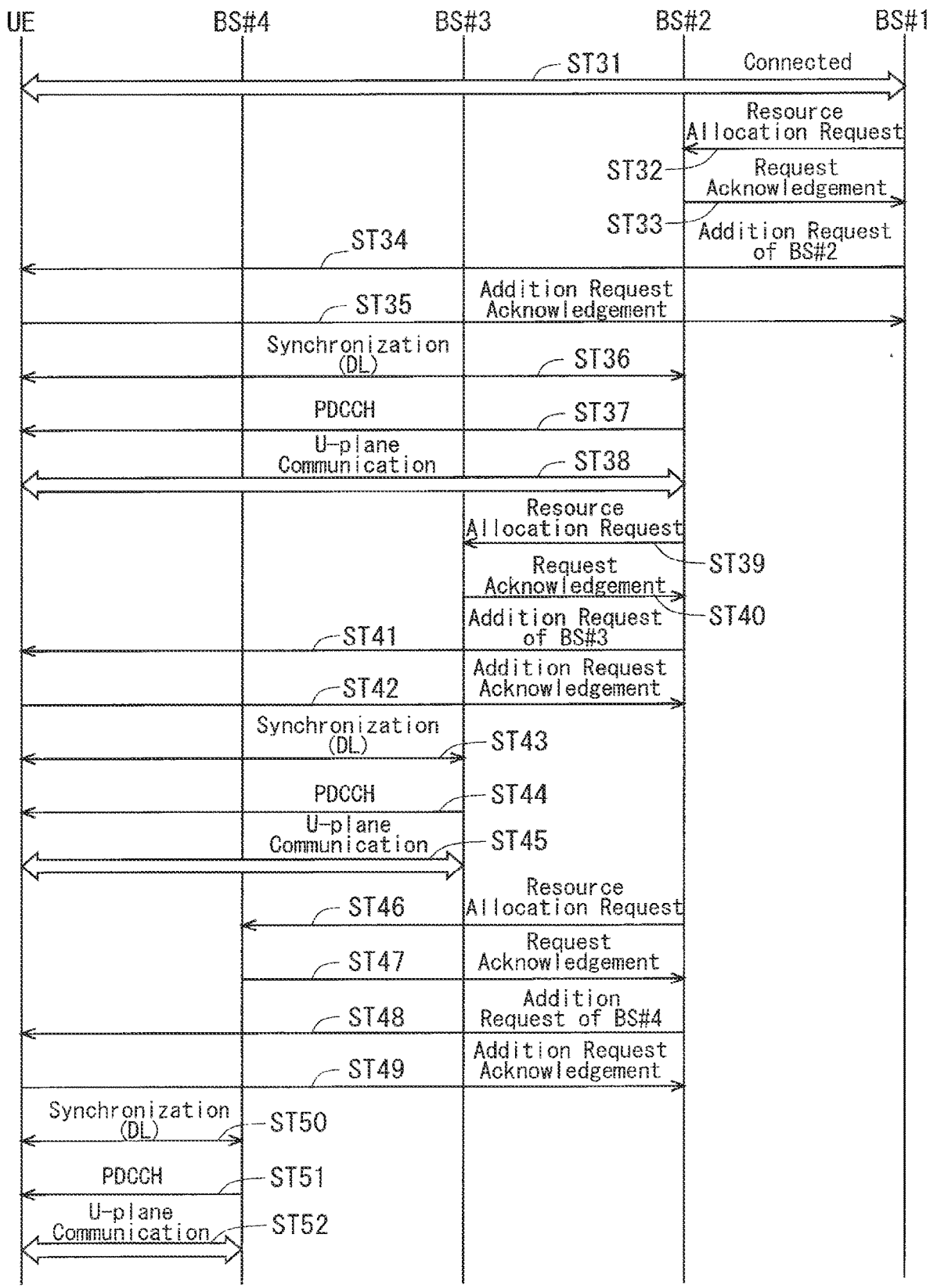
FIG. 19 is a diagram showing one example of a sequence of processing before the start of communication in the communication system 40 according to the first modification of the first embodiment of the present invention.

FIG. 19 is a diagram showing one example of a sequence of processing before the start of communication in the communication system 40 according to the first modification of the first embodiment of the present invention. FIG. 19 shows an example of a sequence for establishing connection with a plurality of base stations. FIG. 19 shows a sequence of adding the BS #2, the BS #3, and the BS #4 in a state where the BS #1 and the UE are connected.

In Step ST31, the BS #1 and the UE are connected.

In Step ST32, the BS #1 notifies the BS #2 of a resource allocation request. In Step ST33, the BS #2 notifies the BS #1 of a request acknowledgement.

In Step ST34, the BS #1 notifies the UE of an addition request of the BS #2. In Step ST35, the UE notifies the BS #1 of an addition request acknowledgement. The UE measures a specified synchronization signal of the BS #2.

In Step ST36, the UE synchronizes with a downlink (DL) of the BS #2.

In Step ST37, the BS #2 notifies the UE of channel control, such as a PDCCH.

In Step ST38, the UE starts communication of user plane (U-plane) data based on a resource allocation condition of the downlink signal specified by the PDCCH.

In Step ST39, the BS #2 notifies the BS #3 of a resource allocation request. In Step ST40, the BS #3 notifies the BS #2 of a request acknowledgement.

In Step ST41, the BS #2 notifies the UE of an addition request of the BS #3.

In Step ST42, the UE notifies the BS #2 of an addition request acknowledgement. The UE measures a specified synchronization signal of the BS #3.

In Step ST43, the UE synchronizes with a downlink (DL) of the BS #3.

In Step ST44, the BS #3 notifies the UE of channel control, such as a PDCCH.

In Step ST45, the UE starts communication of user plane (U-plane) data based on a resource allocation condition of the downlink signal specified by the PDCCH.

In Step ST46, the BS #2 notifies the BS #4 of a recourse allocation request. In Step ST47, the BS #4 notifies the BS #2 of a request acknowledgement.

In Step ST48, the BS #2 notifies the UE of an addition request of the BS #4.

In Step ST49, the UE notifies the BS #2 of an addition request acknowledgement. The UE measures a specified synchronization signal of the BS #3.

In Step ST50, the UE synchronizes with a downlink (DL) of the BS #4.

In Step ST51, the BS #4 notifies the UE of control channel, such as a PDCCH.

In Step ST52, the UE starts communication of user plane (U-plane) data based on a resource allocation condition of the downlink signal specified by the PDCCH.

Deletion of a base station is performed similarly to the addition of a base station. Deletion of the BS #2 is performed based on a command from the BS #1 to the UE. Further, deletion of the BS #3 and the BS #4 is performed based on a command of the BS #2.

When the BS #2 is deleted during connection between the BS #3 and the BS #4, the following sequence may be employed. That is, the BS #2 first issues a deletion command of base stations of the BS #3 and the BS #4, and subsequently the BS #2 is deleted. Alternatively, the BS #1 may issue a deletion command of the BS #2, allowing the BS #3 and the BS #4 to be simultaneously deleted.

When the above-mentioned BS #2 is added, the addition request command of the BS #2 that is to be notified of to the UE contains a message indicating that the BS #2 is valid for the RRC processing function of the second system. Further, the request command of resource allocation from the BS #1 to the BS #2 contains a message indicating the validity of the RRC processing function. If the message indicates invalidity, the BS #2 is not valid for the RRC processing function of the second system, thus playing the same role as the BS #2 of the first embodiment shown in FIG. 9.

According to the present modification above, the sequence shown in FIG. 19 is executed. Specifically, as shown in FIG. 19, radio resource control (RRC) processing for the BS #2, the BS #3, and the BS #4, each being an SeNB, is performed by one of the BS #2, the BS #3, and the BS #4, e.g., performed by the BS #2. This configuration can reduce the load on the BS #1 due to the processing of control plane (C-plane) data. Accordingly, a time period taken for sequence processing such as processing of adding a base station can be reduced, which in turn can reduce delay of processing.

Second Modification of First Embodiment

As a second modification of the first embodiment, one example is given. Specifically, RRC messages are communicated using a selected CC when a plurality of component carriers (CCs) exist in the BS #2 in the configuration of the first modification of the first embodiment shown in FIG. 16. A communication system of the present modification has the same configuration as that of the communication system 40 of the first modification of the first embodiment shown in FIG. 16, and therefore illustration and common description of the configuration are omitted.

Figure 20:
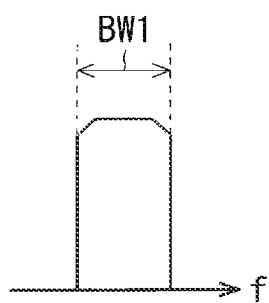
FIG. 20 is a diagram showing one example of frequencies of transmission and reception waves used by a communication system according to a second modification of the first embodiment of the present invention.
Figure 21:
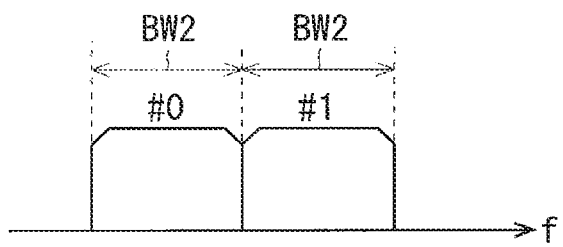
FIG. 21 is a diagram showing one example of frequencies of transmission and reception waves used by the communication system according to the second modification of the first embodiment of the present invention.
Figure 22:
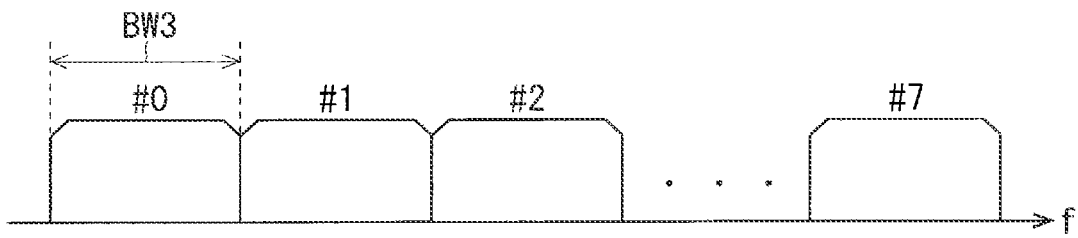
FIG. 22 is a diagram showing one example of frequencies of transmission and reception waves used by the communication system according to the second modification of the first embodiment of the present invention.

FIG. 20 to FIG. 22 are each a diagram showing one example of frequencies of transmission and reception waves used by a communication system according to a second modification of the first embodiment of the present invention. In FIG. 20 to FIG. 22, the horizontal axis represents frequency f FIG. 20 shows frequencies of transmission and reception waves used by the BS #1. FIG. 21 shows frequencies of transmission and reception waves used by the BS #2. FIG. 22 shows frequencies of transmission and reception waves used by the BS #3 and the BS #4.

As shown in FIG. 20, the BS #1 uses one type of transmission and reception waves to transmit and receive RRC messages for the first system. A bandwidth BW1 of the transmission and reception waves used by the BS #1 is 20 MHz, for example.

As shown in FIG. 21, the BS #2 handles two CCs. Therefore, in the present modification, RRC messages are transmitted using any of CC #0 and CC #1. With this, the UE can obtain necessary RRC information without performing modulation processing and demodulation processing on all of the CCs.

A bandwidth BW2 of the transmission and reception waves used by the BS #2 shown in FIG. 21 is 100 MHz, for example. In the present modification, the CC #0, among the two CCs used by the BS #2, is used to transmit and receive RRC messages for the second system.

Further, in the present modification, the CC #1 of the BS #2, to which RRC is not allocated, is treated equally with other BS #3 and BS #4. This can simplify management of user plane (U-plane) resources.

A bandwidth BW3 of the transmission and reception waves used by the BS #3 shown in FIG. 22 is 100 MHz, for example. When the BS #3 transmits and receives RRC messages for the second system, the RRC messages are mapped to any CC of CC #0 to CC #7, or to a plurality of CCs. Handling RRC using only a part of CCs can simplify management of user plane (U-plane) resources of other CCs to which RRC is not mapped.

Third Modification of First Embodiment

As a third modification of the first embodiment, one method is given. Specifically, the configuration of the first embodiment and the configuration of the first modification of the first embodiment are combined. In the first embodiment, the BS #1 executes the RRC processing function for the second system. In contrast, in the first modification of the first embodiment, the BS #2 executes the RRC processing function for the second system.

Figure 23:
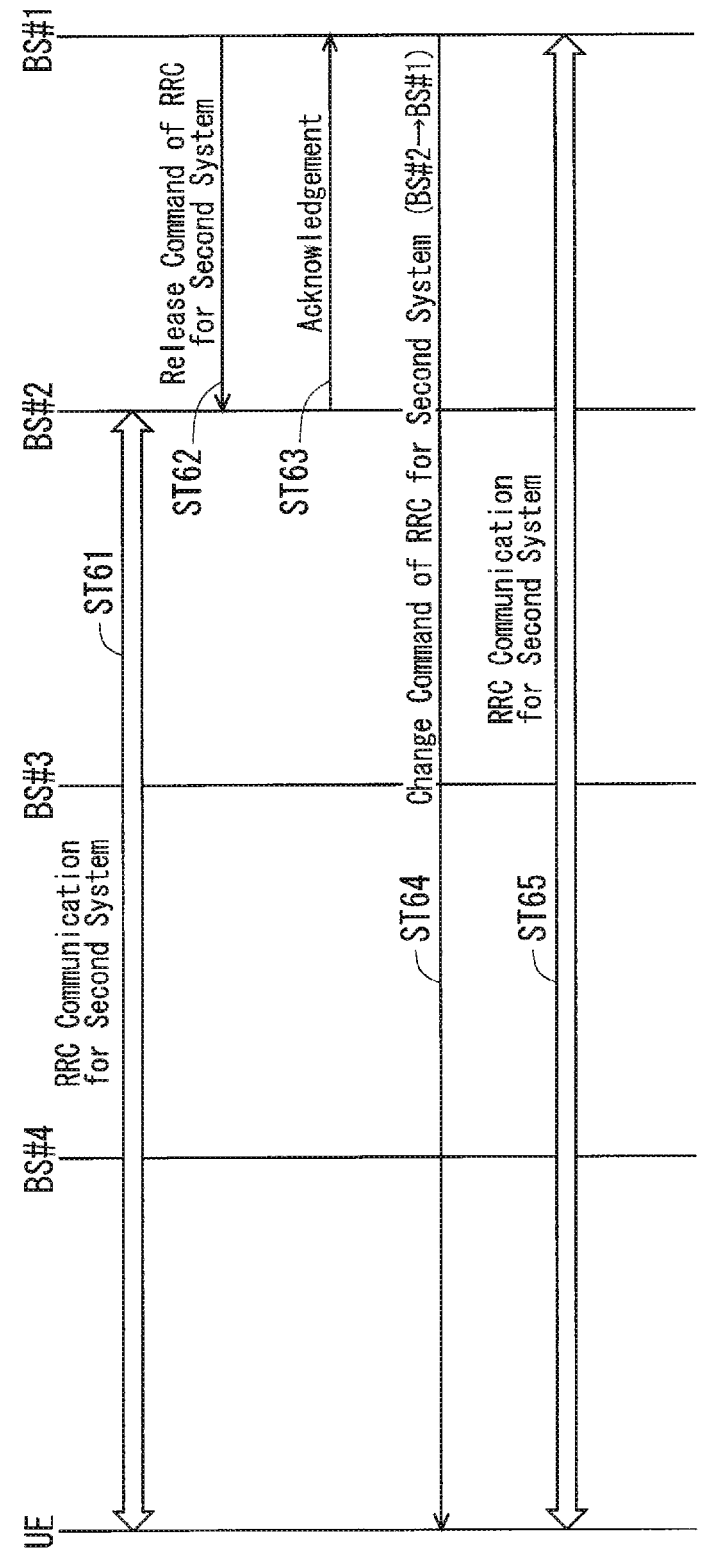
FIG. 23 is a diagram showing one example of a sequence of processing to change an executor of an RRC processing function for a second system from a BS #2 to a BS #1.

FIG. 23 is a diagram showing one example of a sequence of processing to change an executor of the RRC processing function for the second system from the BS #2 to the BS #1.

In Step ST61, RRC communication for the second system is performed between the BS #2 and the UE.

In Step ST62, the BS #1 notifies the BS #2 of a release command of RRC processing for the second system.

In Step ST63, the BS #2 notifies the BS #1 of a positive acknowledgement.

In Step ST64, the BS #1 notifies the UE of a change command of the RRC processing for the second system. The change command of RRC processing for the second system is a change command of the RRC processing for the second system from the BS #2 to the BS #1. Examples of specific command details include changing a radio resource for handling RRC messages for the second system, and changing a message format.

In Step ST65, RRC communication for the second system is performed between the BS #1 and the UE.

Figure 24:
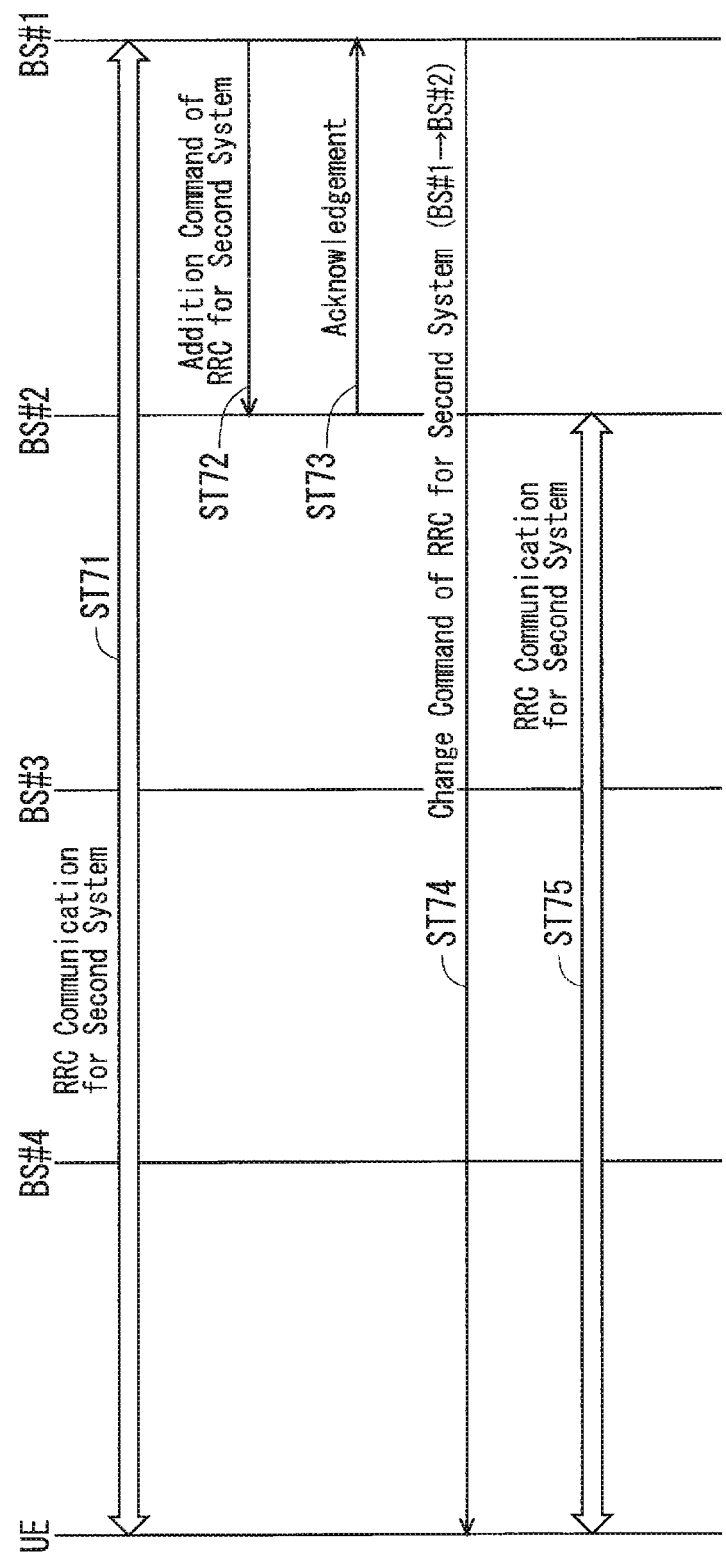
FIG. 24 is a diagram showing one example of a sequence of processing to change an executor of the RRC processing function for the second system from the BS #1 to the BS #2.

FIG. 24 is a diagram showing one example of a sequence of processing to change an executor of the RRC processing function for the second system from the BS #1 to the BS #2.

In Step ST71, RRC communication for the second system is performed between the BS #1 and the UE.

In Step ST72, the BS #1 notifies the BS #2 of an addition command of RRC processing for the second system.

In Step ST73, the BS #2 notifies the BS #1 of a positive acknowledgement.

In Step ST74, the BS #1 notifies the UE of a change command of the RRC processing for the second system. The change command of RRC processing for the second system is a change command of the RRC processing for the second system from the BS #1 to the BS #2. Examples of specific command details include changing a radio resource for handling RRC messages for the second system, and changing a message format.

In Step ST75, RRC communication for the second system is performed between the BS #2 and the UE.

Enabling change of a base station and a resource to perform RRC processing as described above in turn enables distribution of the load of the RRC processing in accordance with a communication condition of the UE, available functions of the UE, a loaded condition of the base station, and the number of connected terminals, for example.

Further, when high speed communication with low latency is demanded in accordance with a communication condition of the UE, the use of the BS #2 also enables execution of the RRC processing for the second system with reduced latency.

In contrast, when the UE does not object to latency etc. and is in power-saving usage such as by decreasing the number of RRC messages, it is also effective to concentrate the RRC processing for the first system and the RRC processing for the second system at one entity, i.e., the BS #1, where the transmission and reception of the RRC messages are performed.

Second Embodiment

In 5G, the concept of beam control may be added. Further, the intervals at which base station are installed are reduced. This may increase the number of base stations in one cell. Further, various types of base stations may be installed concurrently. For example, base stations of ultra-reliability and low latency communication (URLLC) and a plurality of base stations of different frequencies may be installed concurrently. In such a case, information to be broadcast about base stations is increased. If the information is transmitted by a single macro base station, there is a problem in increasing the processing of the macro base station.

In order to solve such a problem, in the present embodiment, broadcast information is divided into basic information and additional information. The basic information is transmitted from the BS #1 having a large cell radius. The additional information is transmitted from BS #2 that is installed inside the cell of the BS #1 and has a cell radius smaller than that of the BS #1 or equivalent to that of the BS #1.

This configuration can reduce the amount of broadcast information transmitted from a single base station to distribute the load. Further, the amount of information to be transmitted is reduced by narrowing details of the broadcast information down to information necessary for individual base stations. As a result, the occupying proportion of the broadcast information with respect to the entire radio resource can be reduced. Accordingly, the system can be efficient.

Figure 25:
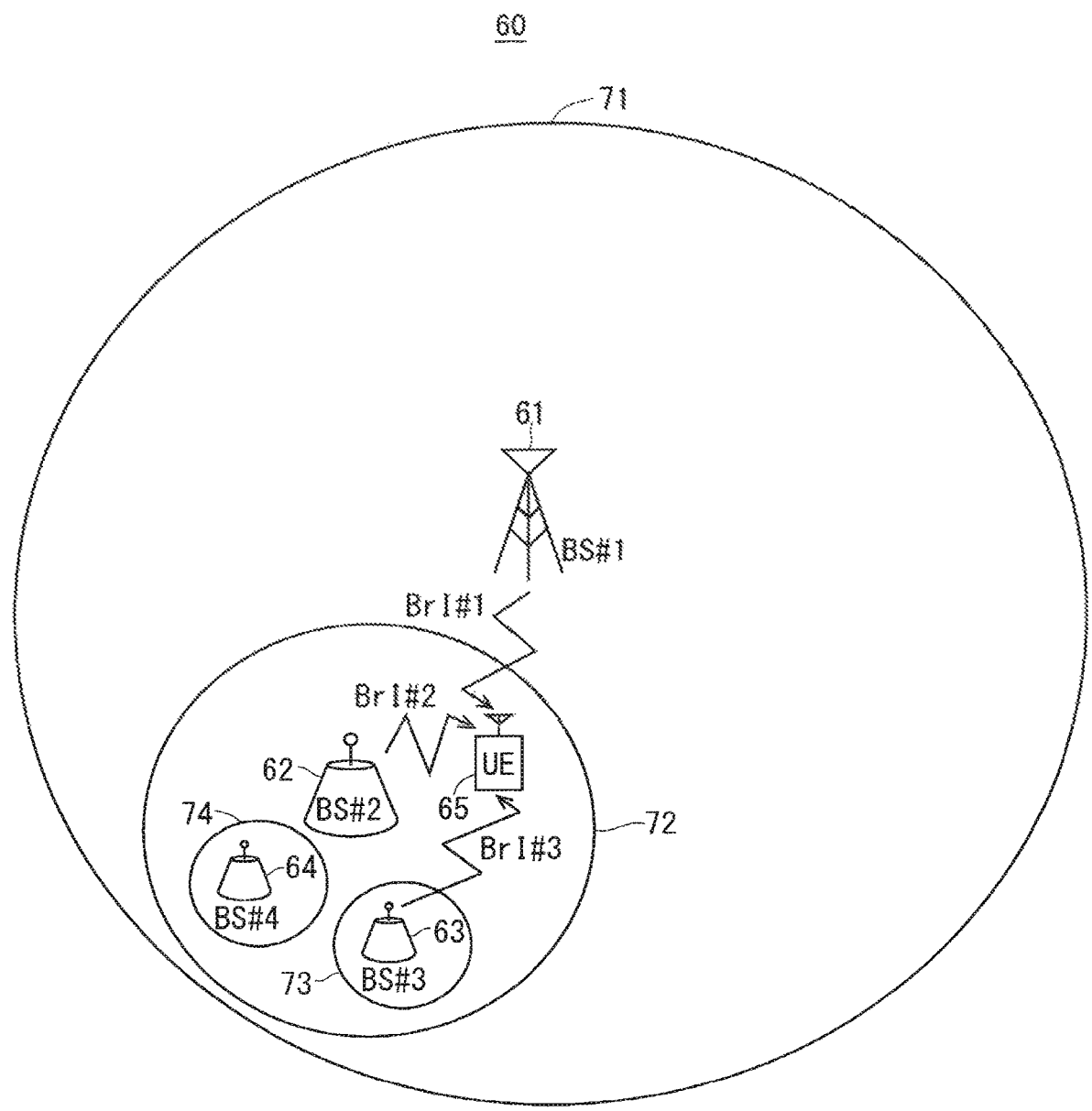
FIG. 25 is a diagram showing the configuration of a communication system 60 according to a second embodiment of the present invention.

FIG. 25 is a diagram showing the configuration of a communication system 60 according to a second embodiment of the present invention. The communication system 60 includes a first base station 61 (hereinafter may be referred to as a "BS #1"), a second base station 62 (hereinafter may be referred to as a "BS #2"), a third base station 63 (hereinafter may be referred to as a "BS #3"), a fourth base station 64 (hereinafter may be referred to as a "BS #4"), and a user equipment (UE) 65.

The BS #1 forms a macro cell 71 having a cell radius of 500 m, for example. The BS #2 forms a micro cell 72 having a cell radius of 200 m, for example. The BS #3 and the BS #4 respectively form small cells 73 and 74 each having a cell radius of 50 m, for example.

For example, if the base stations 61 to 64 are installed as standalone base stations independently of other base stations, pieces of broadcast information BrI #1 to BrI #3 are transmitted from the respective base stations 61 to 64. Although FIG. 25 omits illustration of broadcast information transmitted from the fourth base station 64 for the sake of avoiding complexity and difficulty in understanding the drawing, broadcast information is in actuality also transmitted from the fourth base station 64.

The present embodiment, however, assumes a configuration in which a plurality of base stations are connected to the UE 65 under the cell of the BS #1 described in the first modification of the first embodiment. Although it is possible that the BS #1 transmits configuration information of all of the base stations as broadcast information BrI #1 in the present configuration, the BS #1 transmits only configuration information of the BS #1 and information necessary for initial connection of the BS #2 as broadcast information BrI #1 in order to efficiently transmit broadcast information. The BS #2 transmits pieces of broadcast information other than the information necessary for the initial connection of the BS #2 out of the broadcast information for the BS #2, and pieces of broadcast information for the BS #3 and for the BS #4.

In this manner, in the present embodiment, one of the plurality of SeNBs, specifically the BS #2, at least partially notifies the UE of pieces of broadcast information for each of SeNBs, i.e., pieces of broadcast information for the BS #2, for the BS #3, and for the BS #4.

Adopting the configuration, the BS #1 no longer needs to transmit broadcast information for all of the base stations running under the cell. Therefore, the amount of the data of the broadcast information BrI #1 of the BS #1 can be reduced. With this, the occupying proportion of the broadcast information BrI #1 with respect to the radio resource of the BS #1 can be reduced. Further, reducing the transmission cycle of the broadcast information BrI #1 of the BS #1 can reduce the period of time taken for the UE to complete the initial connection to the BS #1.

Figure 26:
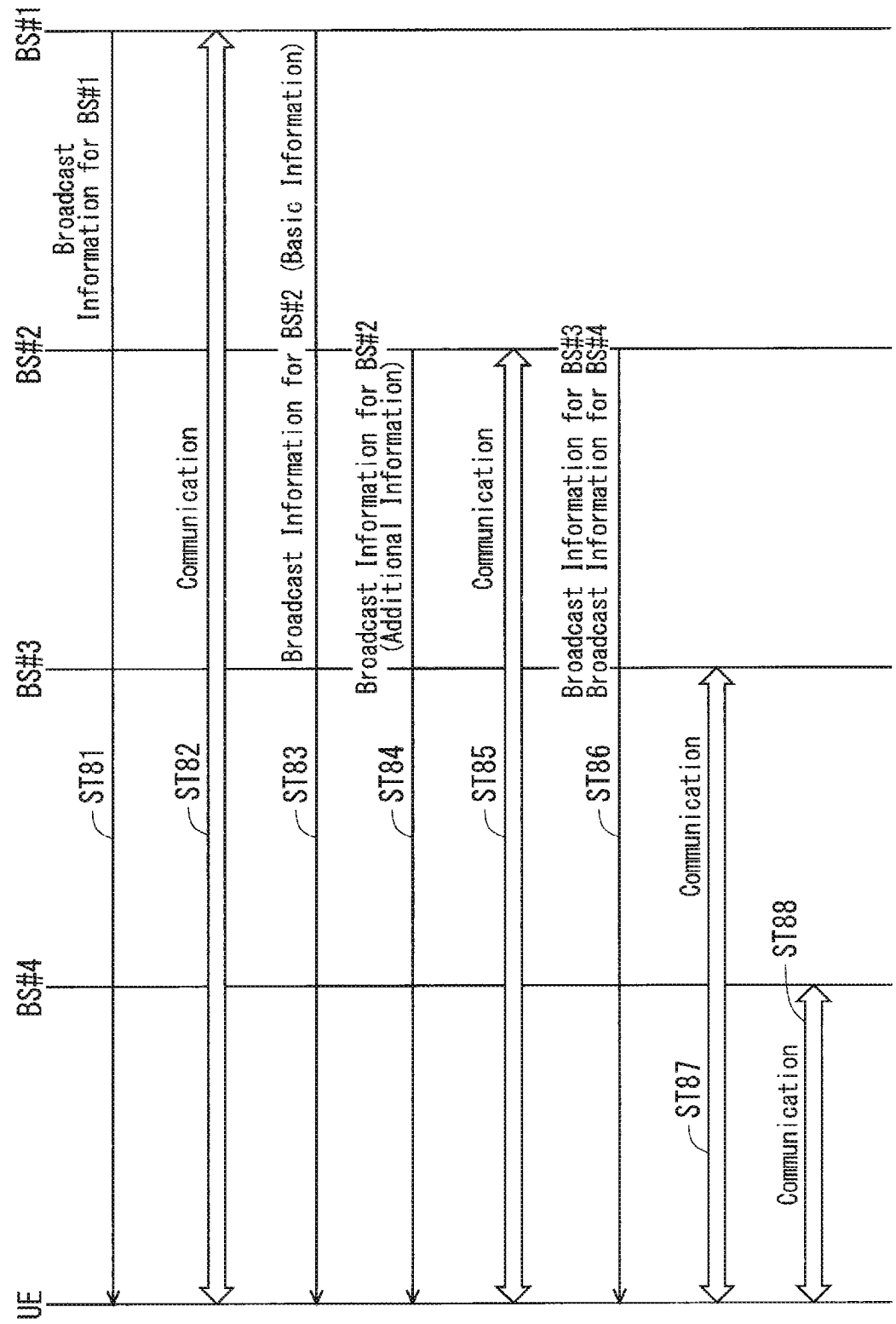
FIG. 26 is a diagram showing one example of a sequence of processing to acquire broadcast information in the communication system 60 according to the second embodiment of the present invention.
Figure 27:
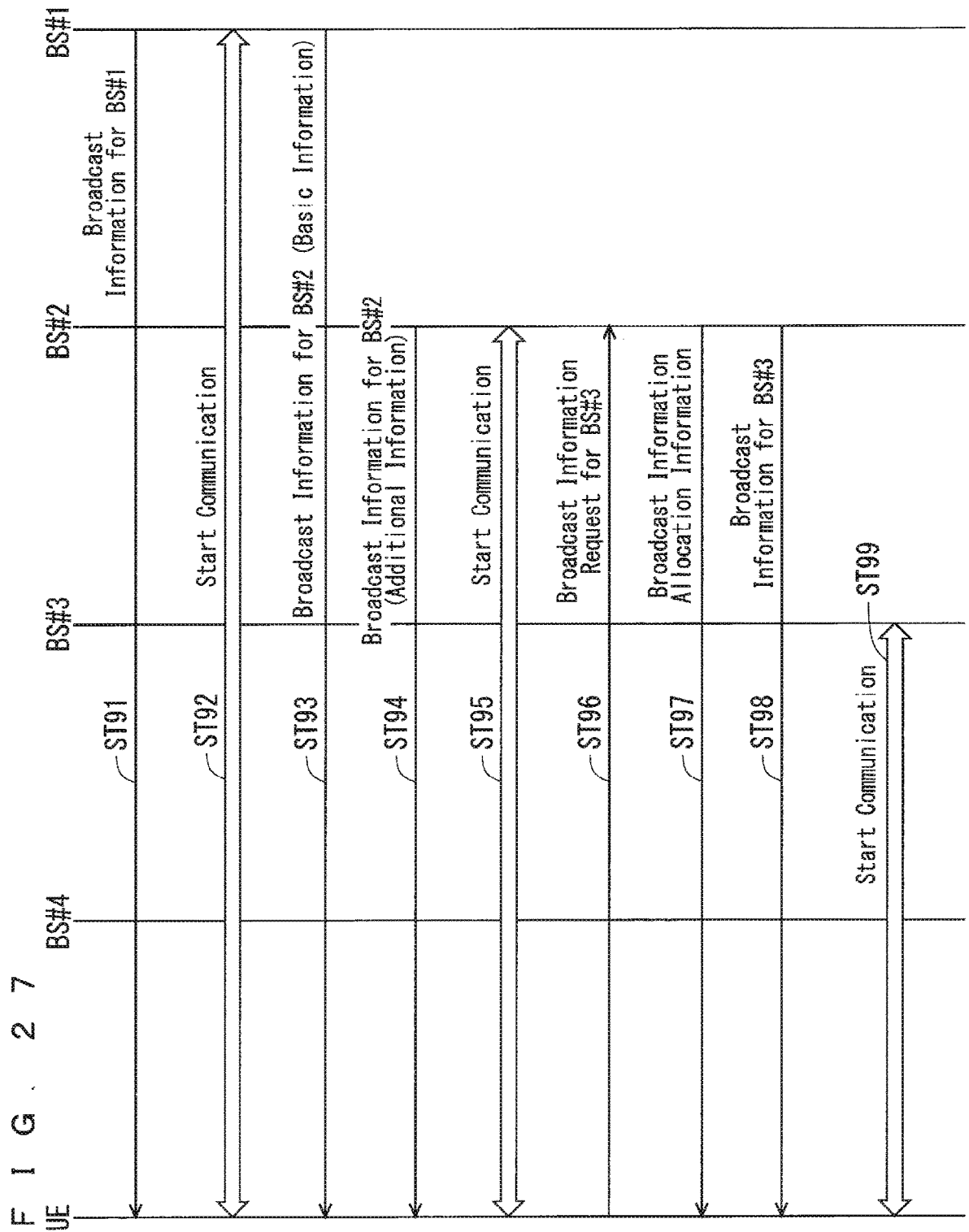
FIG. 27 is a diagram showing one example of a sequence of processing to notify of broadcast information based on a request of a UE.
Figure 28:
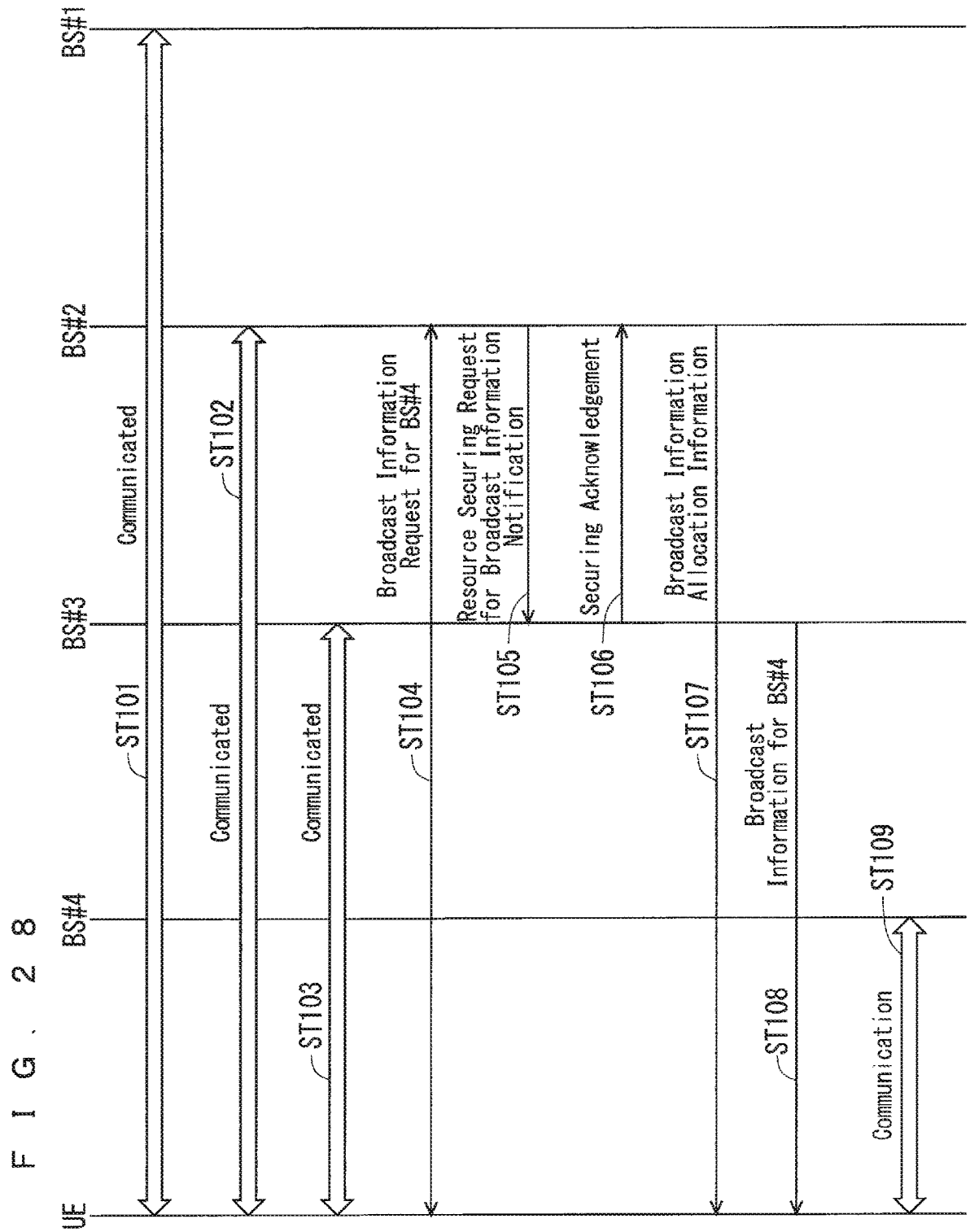
FIG. 28 is a diagram showing another example of a sequence of processing to notify of broadcast information based on a request of the UE.

The BS #2 may directly notify the UE of broadcast information for each SeNB as shown in FIG. 26 to be described later, or the BS #2 may notify the UE of broadcast information for each SeNB via another base station as shown in FIG. 27 and FIG. 28 to be described later.

Examples of pieces of information necessary for the initial connection of the BS #2 include SIB1 (cell access and cell reselection related info, scheduling info list), and SIB2

(radio resource configuration that is common for all UEs) of broadcast information used in LTE-A. Further, information about transmission and reception beams, being additional information, is considered to be also added to a base station for 5G. The additional information corresponds to pieces of broadcast information other than the above-mentioned information necessary for the initial connection of the BS #2.

FIG. 26 is a diagram showing one example of a sequence of processing to acquire broadcast information in the communication system 60 according to the second embodiment of the present invention. FIG. 26 shows one example of a sequence of processing in which the UE acquires pieces of broadcast information for the BS #1, the BS #2, the BS #3, and the BS #4.

In Step ST81, the BS #1 notifies the UE of broadcast information for the BS #1. The UE reads control information for the BS #1 out of the broadcast information notified of from the BS #1.

In Step ST82, communication is performed between the BS #1 and the UE.

In Step ST83, the BS #1 notifies the UE of basic information of broadcast information for the BS #2. When the UE needs to be connected to the BS #2, the UE reads the basic information of the broadcast information for the BS #2 out of the broadcast information of the BS #1, thereby obtaining information to access the BS #2.

In Step ST84, the BS #2 notifies the UE of additional information of the broadcast information for the BS #2. The UE reads the additional information of the BS #2 out of the broadcast information of the BS #2.

In Step ST85, communication is performed between the BS #2 and the UE.

In Step ST86, the BS #2 notifies the UE of broadcast information for the BS #3 and broadcast information for the BS #4. When the UE needs to be connected to the BS #3 or the BS #4, the UE reads control information for the BS #3 or control information for the BS #4 out of the broadcast information notified of from the BS #2.

In Step ST87, communication is performed between the BS #3 and the UE. In Step ST88, communication is performed between the BS #4 and the UE.

FIG. 27 is a diagram showing one example of a sequence of processing to notify of broadcast information based on a request of the UE. FIG. 27 shows an example where the BS #2 acknowledges a broadcast information request of the UE.

In Step ST91, the BS #1 notifies the UE of broadcast information for the BS #1.

In Step ST92, communication is performed between the BS #1 and the UE.

In Step ST93, the BS #1 notifies the UE of basic information of broadcast information for the BS #2.

In Step ST94, the BS #2 notifies the UE of additional information of the broadcast information for the BS #2.

In Step ST95, communication is performed between the BS #2 and the UE.

In Step ST96, the UE notifies the BS #2 of a broadcast information request for the BS #3.

In Step ST97, the BS #2 notifies the UE of radio resource allocation information for notifying of broadcast information.

In Step ST98, the BS #2 notifies the UE of broadcast information for the BS #3 with the radio resource.

In Step ST99, communication is performed between the BS #3 and the UE.

Though the processing shown in FIG. 27, the occupying proportion of broadcast information with respect to a radio resource can be reduced. Particularly in 5G, base station configuration information is increased due to beam control etc., and also base station configuration information is increased due to coping with various scenarios such as massive machine type connection (mMTC) and ultra-reliability and low latency communication (URLLC). Accordingly, efficiency can be enhanced by broadcasting only information necessary for initial connection, and then individually transmitting the remaining information to the UE.

FIG. 28 is a diagram showing another example of a sequence of processing to notify of broadcast information based on a request of the UE. FIG. 28 shows a method of notifying of broadcast information requested by the UE by using a radio resource of a base station, which is different from a radio resource of a base station that has received the request.

In Step ST101, the BS #1 and the UE are communicated.
In Step ST102, the BS #2 and the UE are communicated.
In Step ST103, the BS #3 and the UE are communicated.
In Step ST104, the UE notifies the BS #2 of a broadcast information request for the BS #4.

In Step ST105, the BS #2 notifies the BS #3 of a resource securing request for broadcast information notification. Specifically, the BS #2 notifies of broadcast information by using a radio resource of the BS #3. The BS #2 informs the BS #3 of the size of the broadcast information, information about radio resource in use, etc.

In Step ST106, the BS #3 notifies the BS #2 of secured radio information if the BS #3 succeeded in securing a radio resource.

In Step ST107, the BS #2 notifies the UE of allocation information of the broadcast information.

In Step ST108, the BS #3 notifies the UE of broadcast information for the BS #4.

5G is also considered to have a configuration in which, by using an array antenna, beams are formed with transmission and reception antenna waveforms so as to enhance directivity of the antenna. This configuration enables spatial multiplexing. Such use of a beam resource capable of enabling spatial multiplexing for broadcast information can further reduce the occupying proportion of broadcast information with respect to a radio resource.

Further, it is preferable to employ a configuration that allows free selection of a base station that receives a broadcast information request from the UE, and a base station that transmits a broadcast information request from the UE. With this, radio resources can be utilized further effectively.

In communication requiring high reliability, it is also effective that a plurality of base stations transmit the same broadcast information, as a way to enhance reliability of data.

Further, as in the second modification of the first embodiment, it is preferable that a radio resource to transmit broadcast information is determined per component carrier (CC) also in the present embodiment. This can utilize an idle radio resource, and thus spectral efficiency can be improved.

Third Embodiment

Regarding processing of user plane (U-plane) data, the standard configuration for the split bearer configuration of dual connectivity up to LTE-A is that the packet data convergence protocol (PDCP) function is assigned to a master eNB (MeNB) so that a secondary eNB (SeNB) performs processing of layers lower than the RLC.

In such a configuration, ciphering of the PDCP is concentrated at one entity, and therefore processing can be simplified. In contrast, 5G is considered to have a configuration in which a plurality of base stations communicate with one UE as in the first embodiment. In this case, since the dual connectivity configuration cannot be applied to three and more base stations, the third and subsequent base stations need to be independent of other base stations. Accordingly, there is a problem in that the processing of the PDCP and the like cannot be simplified.

In order to solve the problem, in the present embodiment, pieces of data split from the PDCP of the BS #1 are processed in layers of the RLC and the lower layers of the BS #2 and the BS #3, as a method of processing user plane (U-plane) data of the first embodiment.

Figure 29:
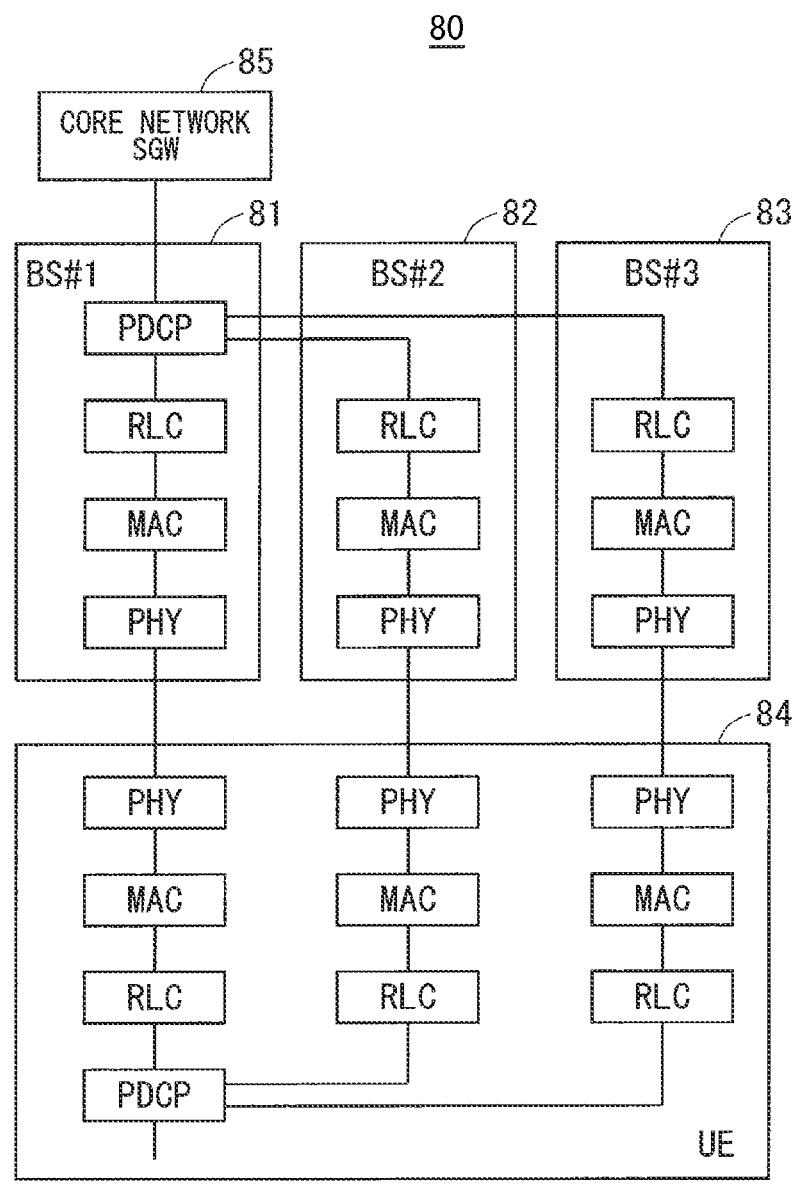
FIG. 29 is a block diagram showing the configuration of a communication system 80 according to a third embodiment of the present invention.

FIG. 29 is a block diagram showing the configuration of a communication system 80 according to a third embodiment of the present invention. The communication system 80 includes a first base station 81 (hereinafter may be referred to as a "BS #1"), a second base station 82 (hereinafter may be referred to as a "BS #2"), a third base station 83 (hereinafter may be referred to as a "BS #3"), a UE 84, and an upper layer device 85. The BS #1 includes a PDCP processing unit, an RLC processing unit, a MAC processing unit, and a PHY processing unit. The BS #2 and the BS #3 each include an RLC processing unit, a MAC processing unit, and a PHY processing unit. The UE 84 includes a PDCP processing unit, an RLC processing unit, a MAC processing unit, and a PHY processing unit for the BS #1, an RLC processing unit, a MAC processing unit, and a PHY processing unit for the BS #2, and an RLC processing unit, a MAC processing unit, and a PHY processing unit for the BS #3. The upper layer device 85 includes a core network device and a serving gateway (abbreviated as SGW).

The BS #1 and the BS #2, and the BS #1 and the BS #3 each correspond to the configuration of the option 3C (split bearer) of dual connectivity.

The BS #1 receives user plane (U-plane) data from the upper layer device 85. The PDCP processing unit of the BS #1 performs PDCP processing of robust header compression (ROHC) and ciphering processing.

The data, to which a PDCP sequence number (SN) is attached, is split into pieces to be transmitted to the RLC processing unit of the BS #1, the RLC processing unit of the BS #2, and the RLC processing unit of the BS #3.

The base stations each perform RLC processing, MAC processing, and PHY processing on the split piece of data, and then each transmit the processed piece of data to the UE 84. The UE 84 performs PHY processing, MAC processing, and RLC processing for each of the base stations on the pieces of data. Subsequently, the UE 84 collects the processed pieces of data into one PDCP. For uplink data, the reverse procedures will be taken.

Such a configuration can simplify processing of the UE, such as PDCP ciphering, even in a system where the UE is connected to a plurality of base stations.

FIG. 30 is a block diagram showing the configuration of a communication system 80A as another example of the communication system according to the third embodiment of the present invention. The communication system 80A shown in FIG. 30 includes the same components as those of the communication system 80 shown in FIG. 29, and therefore the same components are denoted by the same reference symbols to omit common description.

The communication system 80A includes a second base station 82A, instead of the second base station 82 shown in FIG. 29. The second base station 82A further includes a data split processing unit (also referred to as a "SPLIT processing unit") in addition to the components of the second base station 82 of FIG. 29.

As shown in FIG. 30, the data split processing unit of the BS #2 allows a configuration in which the BS #2 transfers, to the BS #3, PDCP data from the BS #1. In this configuration, it is sufficient that the BS #1 supports a user plane (U-plane) interface that is only compatible with connection between the BS #1 and the BS #2. Accordingly, the specifications of the option 3C of dual connectivity of LTE can be supported without making changes thereto.

According to the present embodiment as described above, user plane (U-plane) data, which is contained in information provided by the core network about communication with the UE, is transmitted to and received from the UE via a single base station BS #1 corresponding to an MeNB. Specifically, the core network provides user plane (U-plane) data to an MeNB. The MeNB then provides the user plane (U-plane) data to the UE, and to the UE also via a plurality of SeNBs. This can simplify processing of user plane (U-plane) data when a UE communicates with a plurality of base stations.

Figure 31:
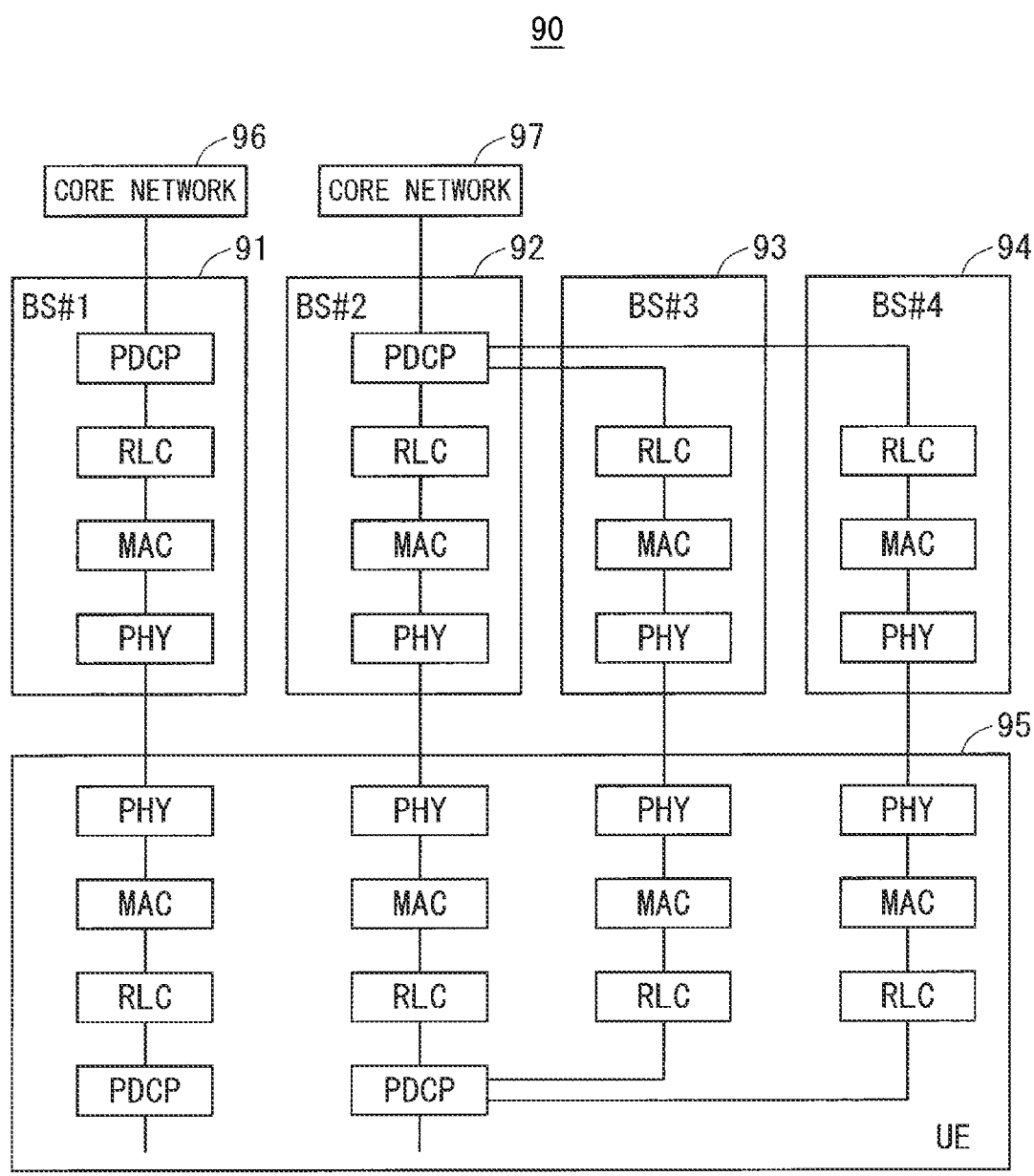
FIG. 31 is a block diagram showing the configuration of a communication system 90 as still another example of the communication system according to the third embodiment of the present invention.

FIG. 31 is a block diagram showing the configuration of a communication system 90 as still another example of the communication system according to the third embodiment of the present invention. The communication system 90 includes a first base station 91 (hereinafter may be referred to as a "BS #1"), a second base station 92 (hereinafter may be referred to as a "BS #2"), a third base station 93 (hereinafter may be referred to as a "BS #3"), a fourth base station 94 (hereinafter may be referred to as a "BS #4"), a UE 95, a first core network 96, and a second core network 97. The first core network 96 is a core network for LTE-A. The second core network 97 is a core network for 5G.

The BS #1 and the BS #2 each include a PDCP processing unit, an RLC processing unit, a MAC processing unit, and a PHY processing unit. The BS #3 and the BS #4 each include an RLC processing unit, a MAC processing unit, and a PHY processing unit. The UE 95 includes a PDCP processing unit, an RLC processing unit, a MAC processing unit, and a PHY processing unit for the BS #1, a PDCP processing unit, an RLC processing unit, a MAC processing unit, and a PHY processing unit for the BS #2, an RLC processing unit, a MAC processing unit, and a PHY processing unit for the BS #3, and an RLC processing unit, a MAC processing unit, and a PHY processing unit for the BS #4.

FIG. 31 shows the following configuration as a method of processing user plane (U-plane) data of the first modification of the first embodiment. That is, the BS #1 of LTE-A is connected to a core network for LTE, for example, the BS #2 of 5G is connected to a core network for 5G, for example, and the BS #3 and the BS #4 of 5G process pieces of user plane (U-plane) data split from the PDCP processing unit of the BS #2, for example.

This is one example of a configuration where the BS #1 is a base station for LTE-A, and the BS #2, the BS #3, and the BS #4 are each of a base station for 5G.

The function of the PDCP processing unit for LTE-A and that for 5G may be different. Even if the function of the PDCP processing unit for LTE-A and that for 5G are the same, the data amount of user plane (U-plane) data for 5G may be several tens of times larger than the data amount of user plane (U-plane) data for LTE, and thus performance of the PDCP processing unit of a conventional base station of LTE-A may be a bottleneck. In such a case, the PDCP processing for 5G needs to be executed by a base station for 5G.

In order to solve the problem as above, the example shown in FIG. 31 employs a configuration in which the BS #2 executes PDCP processing of user plane (U-plane) data of the 5G system, and the user plane (U-plane) data is then transmitted to the RLC processing units of the BS #3 and the BS #4 that run under the BS #2.

The BS #1 is connected to the first core network 96 being a core network for LTE-A. The BS #1 processes user plane (U-plane) data received from the first core network 96 in the PDCP processing unit, the RLC processing unit, the MAC processing unit, and the PHY processing unit of the BS #1, and then transmits the processed data to the UE 95.

The BS #2 is connected to the second core network 97 being a core network (a next generation core network) for 5G. The BS #2 performs processing, such as ROHC, ciphering, and attaching a sequence number (SN) of PDCP, on user plane (U-plane) data received from the second core network 97 in the PDCP processing unit of the BS #2.

The data subjected to the PDCP processing is split into pieces to be transmitted to the RLC processing unit of the BS #2, the RLC processing unit of the BS #3, and the RLC processing unit of the BS #4. The base stations each perform processing on the split piece of data in the RLC processing unit, the MAC processing unit, and the PHY processing unit, and then each transmit the processed piece of data to the UE 95.

The UE 95 performs PHY processing, MAC processing, and RLC processing for each of the base stations on the pieces of data. Subsequently, the UE 95 collects the processed pieces of data into two PDCPs, i.e., a PDCP for LTE-A and a PDCP for 5G.

This configuration can simplify PDCP processing irrespective of processing capacity of an LTE-A base station. Further, data of 5G can be transmitted and received without a problem even in a case where a connection interface between the BS #1 and the BS #2 employs a so-called "non ideal network," which is a network that does not guarantee provisions of latency in data processing.

In the example shown in FIG. 31 as above, user plane (U-plane) data for the BS #2, the BS #3, and the BS #4, each being an SeNB as well as being a second system, is transmitted to and received from the UE via one of the BS #2, the BS #3, and the BS #4, e.g., via the BS #2.

Specifically, the core network provides user plane (U-plane) data of the second system to a representative SeNB (BS #2). The representative SeNB then provides the user plane (U-plane) data of the second system to the UE, and to the UE also via a plurality of SeNBs of the same system.

This can simplify processing of user plane (U-plane) data when a UE communicates with a plurality of base stations even in a case where a network that does not guarantee provisions of latency in data processing is employed between different communication systems.

Fourth Embodiment

In the conventional dual connectivity configuration, a UE notifies an MeNB of a measurement result of each base station as a measurement report.

However, when a plurality of base stations form a communication system as in the above first embodiment, notifying only the BS #1 of measurement reports may cause processing concentration at the BS #1.

Particularly in the 5G system, the use of an array antenna having directivity may attach beam characteristics to a transmission and reception signal, and therefore measurement information about beam control etc. may be increased. Accordingly, measurement processing is required more times, in comparison with the conventional method.

In the present embodiment, in the configuration of the first modification of the first embodiment, a measurement result for connection to the BS #2 is reported to the BS #1 before communication between the BS #2 and the UE is established.

After communication between the BS #2 and the UE is established, the BS #1 is notified of a measurement report for the BS #1, and the BS #2 is notified of measurement report for the BS #2, the BS #3, and the BS #4.

Figure 32:
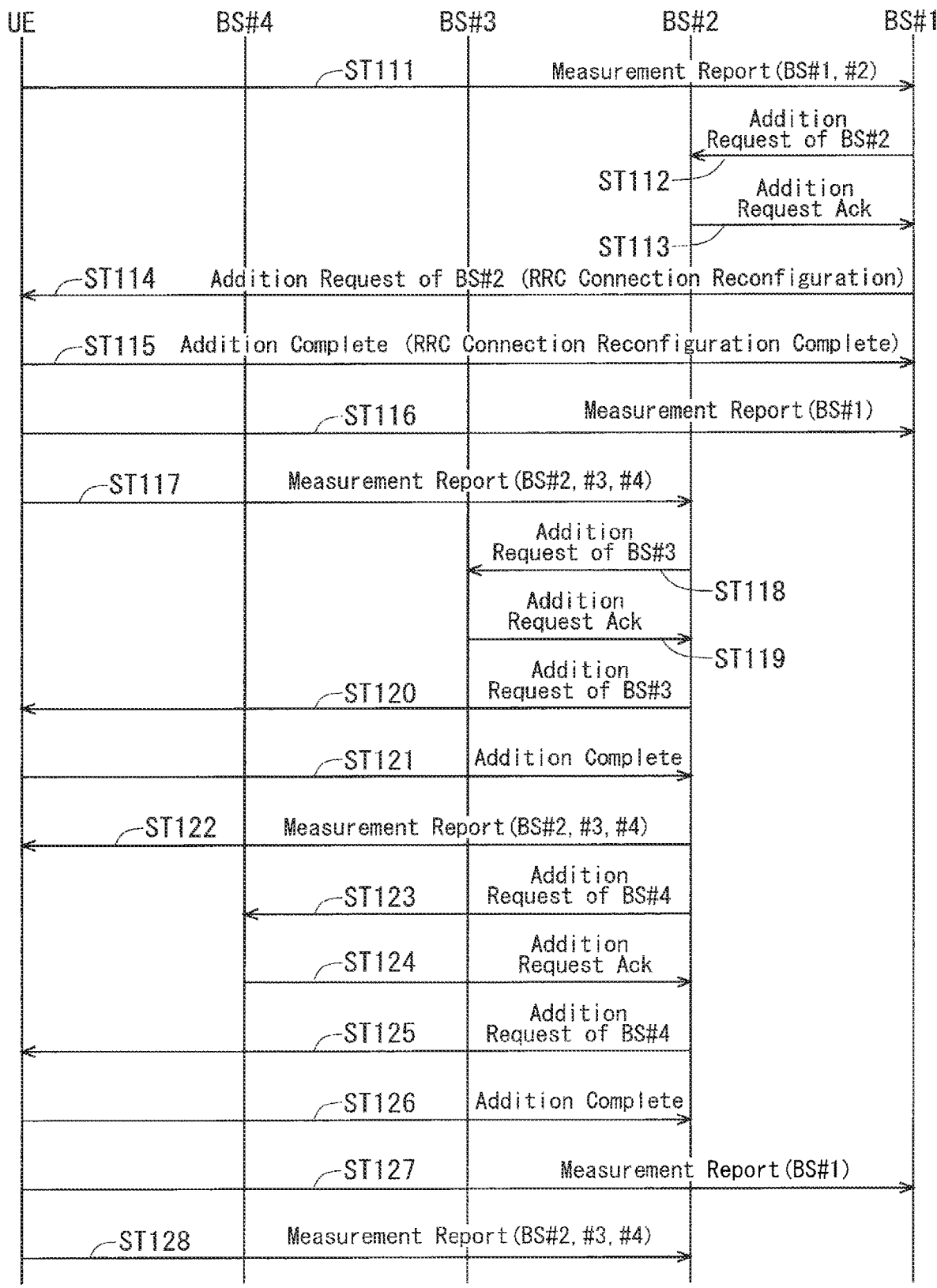
FIG. 32 is a diagram showing one example of a sequence of measurement report processing of a communication system according to a fourth embodiment of the present invention.

FIG. 32 is a diagram showing one example of a sequence of measurement report processing of a communication system according to a fourth embodiment of the present invention.

When the UE is connected to the BS #1, in Step ST111, the UE notifies the BS #1 of measurement information about the BS #1 and the BS #2 as measurement reports.

In Step ST112, the BS #1 notifies the BS #2 of an addition request of a base station in order to determine whether communication between the BS #2 and the UE is possible based on the measurement information about the BS #2. Specifically, the BS #1 notifies the BS #2 of an addition request of the BS #2.

In Step ST113, if the addition of a base station is possible, the BS #2 notifies the BS #1 of an addition request acknowledge (hereinafter may be referred to as an "addition request Ack") as a positive response.

In Step ST114, the BS #1 notifies the UE of an RRC connection reconfiguration message as an addition request of a base station. Specifically, the BS #1 notifies the UE of an addition request of the BS #2. The RRC connection reconfiguration message of Step ST114 may contain information of a command to notify the BS #2 of measurement reports of the BS #2, the BS #3, and the BS #4.

In Step ST115, after completing establishment of communication with the BS #2, the UE notifies the BS #1 of an RRC connection reconfiguration complete message as an addition complete notification.

In Step ST116, after establishing communication with the BS #2, the UE notifies the BS #1 of measurement information about the BS #1 as a measurement report for the BS #1.

In Step ST117, the UE notifies the BS #2 of measurement information about the BS #2, the BS #3, and the BS #4 as a measurement report for the BS #2.

In Step ST118, the BS #2 notifies the BS #3 of an addition request of a base station in order to determine whether communication between the BS #3 and the UE is possible based on the measurement information about the BS #3. Specifically, the BS #2 notifies the BS #3 of an addition request of the BS #3.

In Step ST119, if the addition of a base station is possible, the BS #3 notifies the BS #2 of an addition request Ack as a positive response.

In Step ST120, the BS #2 notifies the UE of an RRC connection reconfiguration message as an addition request of a base station. Specifically, the BS #2 notifies the UE of an addition request of the BS #3.

In Step ST121, after completing establishment of communication with the BS #3, the UE notifies the BS #2 of an RRC connection reconfiguration complete message as an addition complete notification.

In Step ST122, the BS #2 notifies the UE of measurement information about the BS #2, the BS #3, and the BS #4 as a measurement report.

In Step ST123, the BS #2 notifies the BS #4 of an addition request of a base station in order to determine whether communication between the BS #4 and the UE is possible based on the measurement information about the BS #4. Specifically, the BS #2 notifies the BS #3 of an addition request of the BS #4.

In Step ST124, if the addition of a base station is possible, the BS #4 notifies the BS #2 of an addition request Ack as a positive response.

In Step ST125, the BS #2 notifies the UE of an RRC connection reconfiguration message as an addition request of a base station. Specifically, the BS #2 notifies the UE of an addition request of the BS #4.

In Step ST126, after completing establishment of communication with the BS #4, the UE notifies the BS #2 of an RRC connection reconfiguration complete message as an addition complete notification.

In Step ST127, after establishing communication with the BS #4, the UE notifies the BS #1 of measurement information about the BS #1 as a measurement report for the BS #1.

In Step ST128, the UE notifies the BS #2 of measurement information about the BS #2, the BS #3, and the BS #4 as a measurement report for the BS #2.

Through the above processing, measurement information can be handled per radio system even if the radio system differs between the BS #1 of LTE-A, for example, and the BS #2, the BS #3, and the BS #4 of 5G, for example. Accordingly, a system can be constructed without affecting the size of measurement information of other radio systems etc.

Further, the UE may be capable of selecting a base station used for the notification of a measurement report. For example, the UE may use radio resources of the BS #3 and the BS #4 to notify of measurement reports for the BS #2, the BS #3, and the BS #4.

In this configuration, examples of a method of configuring the recipient of a measurement report include a method of using RRC messages. With this method, a measurement report can be notified of by using an idle radio resource even when pieces of measurement information are increased due to beam control etc.

If communication with a base station as the notification destination of a measurement report is deleted, with the above-mentioned RRC messages, the notification destination of a measurement report may be changed or may be returned to the notification destination before the change.

The embodiments and the modifications are merely illustrations of the present invention, and can be freely combined within the scope of the present invention. Any constituent elements of the embodiments and the modifications can be appropriately modified or omitted.

While the invention has been described in detail, the foregoing description is in all aspects illustrative and not restrictive. It is therefore understood that numerous modifications and variations can be devised without departing from the scope of the invention.

EXPLANATION OF REFERENCE SIGNS

20 communication system, 21 first base station (MeNB), 22 second base station (SeNB #1), 23 third base station (SeNB #2), 24 user equipment (UE), 25 core network

The invention claimed is:

1. A communication system comprising:
a communication terminal device;
a plurality of base station devices configured to perform radio communication with the communication terminal device; and
a core network configured to provide information about the communication with the communication terminal device to the plurality of base station devices, wherein
the plurality of base station devices include a master base station device configured to perform main processing, and a plurality of secondary base station devices to be connected to the master base station device,
at least one of control plane data about control of the communication and user plane data about a user is transmitted to and received from the communication terminal device via the master base station device, the control plane data and the user plane data being contained in the information provided by the core network about the communication with the communication terminal device,
one of the plurality of secondary base station devices notifies the communication terminal device of at least a part of broadcast information for at least another one of the plurality of secondary base station devices,
the master base station device is a base station device of LTE-A, and
the plurality of secondary base station devices are base station devices of 5G.

2. The communication system according to claim 1, wherein
the master base station device and the plurality of secondary base station devices use frequency bands different from each other.

3. The communication system according to claim 2, wherein
each of the master base station device and the plurality of secondary base station devices uses an array antenna for the radio communication with the communication terminal device, and
the plurality of secondary base station devices use an identical frequency band which is different from a frequency band used by the master base station device.

* * * * *